US010616737B2

(12) United States Patent
Liu et al.

(10) Patent No.: US 10,616,737 B2
(45) Date of Patent: Apr. 7, 2020

(54) ENHANCED MACHINE TYPE COMMUNICATIONS PHYSICAL UPLINK CONTROL CHANNEL DESIGN

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/045,206

(22) Filed: Jul. 25, 2018

(65) Prior Publication Data

US 2019/0037376 A1 Jan. 31, 2019

Related U.S. Application Data

(60) Provisional application No. 62/539,407, filed on Jul. 31, 2017.

(51) Int. Cl.
*H04W 4/70* (2018.01)
*H04W 72/04* (2009.01)
(Continued)

(52) U.S. Cl.
CPC ............. *H04W 4/70* (2018.02); *H04L 5/0044* (2013.01); *H04L 5/0053* (2013.01);
(Continued)

(58) Field of Classification Search
CPC ...................................................... H04W 4/70
See application file for complete search history.

(56) References Cited

U.S. PATENT DOCUMENTS

2011/0129033 A1* 6/2011 Dai ..................... H04B 7/063
375/299
2016/0285535 A1 9/2016 Kim et al.
2017/0374659 A1* 12/2017 Hwang ............ H04W 72/0413

FOREIGN PATENT DOCUMENTS

EP 3041154 A1 7/2016

OTHER PUBLICATIONS

"3rd Generation Partnership Project; Technical Specification Group Radio Access Network; Evolved Universal Terrestrial Radio Access (E-UTRA); Physical channels and modulation (Release 14)", 3GPP Standard ; Technical Specification; 3GPP TS 36.211, 3rd Generation Partnership Project (3GPP), Mobile Competence Centre; 650, Route Des Lucioles; F-06921, Sophia-Antipolis Cedex; France, vol. RAN WG1, No. V14.3.0, Jun. 23, 2017 (Jun. 23, 2017), pp. 8-75, XP051298991, [retrieved on Jun. 23, 2017].
(Continued)

*Primary Examiner* — John D Blanton
(74) *Attorney, Agent, or Firm* — Liem T. Do

(57) ABSTRACT

Methods, systems, and devices for wireless communication are described. A user equipment (UE) may receive a configuration message indicating a payload size configuration for machine type communication (MTC) physical uplink control channel (PUCCH) messages. The UE may generate an MTC PUCCH message based at least in part on the payload size configuration and a PUCCH format of MTC uplink control information for transmission by the UE. The UE may transmit the MTC PUCCH message over a plurality of RBs in a frequency domain.

18 Claims, 17 Drawing Sheets

(51) Int. Cl.
*H04L 5/00* (2006.01)
*H04W 88/02* (2009.01)
*H04L 1/18* (2006.01)

(52) U.S. Cl.
CPC ....... *H04W 72/0413* (2013.01); *H04L 1/1812* (2013.01); *H04L 1/1822* (2013.01); *H04L 5/001* (2013.01); *H04L 5/005* (2013.01); *H04W 88/023* (2013.01)

(56) References Cited

OTHER PUBLICATIONS

International Search Report and Written Opinion—PCT/US2018/043871—ISA/EPO—dated Oct. 16, 2018.

* cited by examiner

ENHANCED MACHINE TYPE COMMUNICATIONS PHYSICAL UPLINK CONTROL CHANNEL DESIGN

CROSS REFERENCES

The present Application for Patent claims the benefit of U.S. Provisional Patent Application No. 62/539,407 by Liu et al., entitled "Enhanced Machine Type Communications Physical Uplink Control Channel Design," filed Jul. 31, 2017, assigned to the assignee hereof, and expressly incorporated herein.

BACKGROUND

The following relates generally to wireless communication, and more specifically to a physical uplink control channel (PUCCH) design for enhanced machine type communications (eMTC) in a shared or unlicensed spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Certain wireless communications systems may include machine type communication (MTC) devices (e.g., UEs) communicating in designated radio frequency bands. For example, an MTC device may include communications from devices that integrate sensors or meters to measure or capture information and relay that information to a central server or application program that can make use of the information or present the information to humans interacting with the program or application. Certain radio frequency bands, however, may be configured such that any devices communicating in the radio frequency bands must meet various communication configuration protocols (e.g., maximum transmit power, power spectral density (PSD) requirements, bandwidth constraints, and the like). While many uplink and/or downlink channel communications may satisfy these protocols, other types of communications (e.g., PUCCH communications for MTC (or eMTC) devices) may need to be designed to comply with the protocols for a particular radio frequency band.

SUMMARY

The described techniques relate to improved methods, systems, devices, or apparatuses that for physical uplink control signaling for enhanced machine type communications (eMTC) in a shared or unlicensed spectrum (eMTC-U). Generally, the described techniques provide for eMTC-U PUCCH design that supports communications in certain radio frequency bands (e.g., such as the 5 GHz industrial, scientific, and medical (ISM) bands). For example, the described techniques may support an eMTC-U PUCCH design that complies with bandwidth, transmit power, etc., requirements associated with communicating in the radio frequency band. For example, a base station may independently or in conjunction with a network device provide an indication of the machine type communication (MTC) PUCCH message configuration to a user equipment (UE). The base station may select the payload size configuration to be used by the UE (and other UEs communicating with the base station). In some aspects, the payload size configuration may indicate either directly or indirectly (e.g., by design) that amount of data that the UE(s) may transmit in the MTC PUCCH message. In some aspects, the payload size configuration may design the MTC PUCCH message to be transmitted over multiple resource blocks (RBs). The base station may transmit the payload size configuration to the UE(s) in a configuration message and the UE(s) may use the payload size configuration to generate an MTC PUCCH message. The UE(s) may transmit the MTC PUCCH message to the base station over multiple RBs.

A method of wireless communication is described. The method may include receiving, at a UE, a configuration message indicating a payload size configuration for MTC PUCCH messages, generating an MTC PUCCH message based at least in part on the payload size configuration and a PUCCH format of MTC uplink control information for transmission by the UE, and transmitting the MTC PUCCH message over a plurality of RBs in a frequency domain.

An apparatus for wireless communication is described. The apparatus may include means for receiving, at a UE, a configuration message indicating a payload size configuration for MTC PUCCH messages, means for generating an MTC PUCCH message based at least in part on the payload size configuration and a PUCCH format of MTC uplink control information for transmission by the UE, and means for transmitting the MTC PUCCH message over a plurality of RBs in a frequency domain.

Another apparatus for wireless communication is described. The apparatus may include a processor, memory in electronic communication with the processor, and instructions stored in the memory. The instructions may be operable to cause the processor to receive, at a UE, a configuration message indicating a payload size configuration for MTC PUCCH messages, generate an MTC PUCCH message based at least in part on the payload size configuration and a PUCCH format of MTC uplink control information for transmission by the UE, and transmit the MTC PUCCH message over a plurality of RBs in a frequency domain.

A non-transitory computer readable medium for wireless communication is described. The non-transitory computer-readable medium may include instructions operable to cause a processor to receive, at a UE, a configuration message indicating a payload size configuration for MTC PUCCH messages, generate an MTC PUCCH message based at least in part on the payload size configuration and a PUCCH format of MTC uplink control information for transmission by the UE, and transmit the MTC PUCCH message over a plurality of RBs in a frequency domain.

Some examples of the method, apparatus, and non-transitory computer-readable medium described above may further include processes, features, means, or instructions for identifying, based at least in part on the payload size configuration, a data symbol to use for modulating data bits in a computer generated sequence (CGS) of an RB of the plurality of RBs. Some examples of the method, apparatus, and non-transitory computer-readable medium described above may further include processes, features, means, or instructions for modulating each CGS of the RB, where each CGS of the RB may be modulated with a different data symbol.

Some examples of the method, apparatus, and non-transitory computer-readable medium described above may further include processes, features, means, or instructions for identifying, based at least in part on the payload size configuration, a data symbol to use for modulating data bits in a CGS of an RB of the plurality of RBs. Some examples of the method, apparatus, and non-transitory computer-readable medium described above may further include processes, features, means, or instructions for modulating each CGS of the RB, where each CGS of the RB may be modulated with a same data symbol.

Some examples of the method, apparatus, and non-transitory computer-readable medium described above may further include processes, features, means, or instructions for repeating a reference signal in the plurality of RBs of the MTC PUCCH message.

Some examples of the method, apparatus, and non-transitory computer-readable medium described above may further include processes, features, means, or instructions for applying, for the UE, a sequence to different tones of the plurality of RBs of the MTC PUCCH message, where the sequence may be non-repeating in a frequency domain over the plurality of RBs.

Some examples of the method, apparatus, and non-transitory computer-readable medium described above may further include processes, features, means, or instructions for applying, for the UE, a same cyclic shift to each of the plurality of RBs of the MTC PUCCH message. Some examples of the method, apparatus, and non-transitory computer-readable medium described above may further include processes, features, means, or instructions for applying, for the UE, a same cover code to different symbol periods in each of the plurality of RBs of the MTC PUCCH message.

Some examples of the method, apparatus, and non-transitory computer-readable medium described above may further include processes, features, means, or instructions for applying a first sequence to the first subset of RBs according to a first PUCCH format. Some examples of the method, apparatus, and non-transitory computer-readable medium described above may further include processes, features, means, or instructions for applying a second sequence to the first subset of RBs according to a second PUCCH format, where the first sequence may be the same as the second sequence.

Some examples of the method, apparatus, and non-transitory computer-readable medium described above may further include processes, features, means, or instructions for applying a first cyclic shift to a first portion of the first subset of RBs. Some examples of the method, apparatus, and non-transitory computer-readable medium described above may further include processes, features, means, or instructions for applying a second cyclic shift to a second portion of the first subset of RBs, where the first cyclic shift may be different from the second cyclic shift.

Some examples of the method, apparatus, and non-transitory computer-readable medium described above may further include processes, features, means, or instructions for using different reference signal and data symbol location configuration for a first portion of the first subset of RBs and a second portion of the first subset of RBs.

Some examples of the method, apparatus, and non-transitory computer-readable medium described above may further include processes, features, means, or instructions for using a same base sequence for a first portion of the first subset of RBs and a second portion of the first subset of RBs.

A method of wireless communication is described. The method may include selecting a payload size configuration for an MTC PUCCH message from a UE, the payload size configuration including a maximum amount of data available for the MTC PUCCH message, transmitting a configuration message to the UE to indicate the payload size configuration, and receiving the MTC PUCCH message from the UE over a plurality of RBs.

An apparatus for wireless communication is described. The apparatus may include means for selecting a payload size configuration for an MTC PUCCH message from a UE, the payload size configuration including a maximum amount of data available for the MTC PUCCH message, means for transmitting a configuration message to the UE to indicate the payload size configuration, and means for receiving the MTC PUCCH message from the UE over a plurality of RBs.

Another apparatus for wireless communication is described. The apparatus may include a processor, memory in electronic communication with the processor, and instructions stored in the memory. The instructions may be operable to cause the processor to select a payload size configuration for an MTC PUCCH message from a UE, the payload size configuration including a maximum amount of data available for the MTC PUCCH message, transmit a configuration message to the UE to indicate the payload size configuration, and receive the MTC PUCCH message from the UE over a plurality of RBs.

A non-transitory computer readable medium for wireless communication is described. The non-transitory computer-readable medium may include instructions operable to cause a processor to select a payload size configuration for an MTC PUCCH message from a UE, the payload size configuration including a maximum amount of data available for the MTC PUCCH message, transmit a configuration message to the UE to indicate the payload size configuration, and receive the MTC PUCCH message from the UE over a plurality of RBs.

Some examples of the method, apparatus, and non-transitory computer-readable medium described above may further include processes, features, means, or instructions for demodulating each CGS of the plurality of RBs of the MTC PUCCH message, where each CGS of the plurality of RBs may be modulated with a different data symbol.

Some examples of the method, apparatus, and non-transitory computer-readable medium described above may further include processes, features, means, or instructions for demodulating each CGS of the plurality of RBs of the MTC PUCCH message, where each CGS of the plurality of RBs may be modulated with a same data symbol.

Some examples of the method, apparatus, and non-transitory computer-readable medium described above may further include processes, features, means, or instructions for receiving a reference signal in the plurality of RBs of the MTC PUCCH message, where the reference signal may be repeated in the plurality of RBs.

Some examples of the method, apparatus, and non-transitory computer-readable medium described above may further include processes, features, means, or instructions for recovering each of the plurality of RBs of the MTC PUCCH message using a sequence applied to different tones of the plurality of RBs of the PUCCH message, where the sequence may be non-repeating over the plurality of RBs.

Some examples of the method, apparatus, and non-transitory computer-readable medium described above may further include processes, features, means, or instructions for reversing cyclically shifting, for the UE, each of the plurality of RBs of the MTC PUCCH message using a same cyclic shift code. Some examples of the method, apparatus, and non-transitory computer-readable medium described above may further include processes, features, means, or instructions for recovering each of the plurality of RBs of the MTC PUCCH message using a same cover code.

Some examples of the method, apparatus, and non-transitory computer-readable medium described above may further include processes, features, means, or instructions for identifying a first subset of cyclic shifts applied to the first subset of RBs according to a first PUCCH format. Some examples of the method, apparatus, and non-transitory computer-readable medium described above may further include processes, features, means, or instructions for identifying a second subset of cyclic shifts applied to the first subset of RBs according to a second PUCCH format.

Some examples of the method, apparatus, and non-transitory computer-readable medium described above may further include processes, features, means, or instructions for recovering a first portion of the first subset of RBs using a first cyclic shift. Some examples of the method, apparatus, and non-transitory computer-readable medium described above may further include processes, features, means, or instructions for recovering a second portion of the first subset of RBs using a second cyclic shift, where the first cyclic shift may be different from the second cyclic shift.

Some examples of the method, apparatus, and non-transitory computer-readable medium described above may further include processes, features, means, or instructions for recovering, according to a different reference signal and data symbol location configuration, a first portion of the first subset of RBs and a second portion of the first subset of RBs.

Some examples of the method, apparatus, and non-transitory computer-readable medium described above may further include processes, features, means, or instructions for recovering, according to a same base sequence, a first portion of the first subset of RBs and a second portion of the first subset of RBs.

DETAILED DESCRIPTION

Aspects of the disclosure are initially described in the context of a wireless communications system. Aspects of the described techniques may provide for extending the bandwidth of an enhanced machine type communication (eMTC) physical uplink control channel (PUCCH) message to support communicating in certain radio frequency bands. For example, the described techniques may include transmitting the machine type communication (MTC) (or eMTC) PUCCH message over multiple resource blocks (RBs) to provide adequate bandwidth for the MTC PUCCH message communication in the radio frequency band and, in some examples, extend the amount of data that can be communicated in the MTC PUCCH message. For example, a base station may select a payload size configuration for MTC PUCCH messages for a user equipment (UE). The payload size configuration may also determine the amount of data that the UE has available for the MTC PUCCH message. For example, the payload size configuration may extend the MTC PUCCH message from one RB to multiple RBs. This may extend the bandwidth used by the MTC PUCCH message and provide additional data capacity and/or redundancy options for the MTC PUCCH message. The base station may transmit a configuration message to the UE indicating the payload size configuration. The UE may receive the configuration message and use the payload size configuration to generate an MTC PUCCH message. The UE may transmit the MTC PUCCH message to the base station over the multiple RBs.

Aspects of the disclosure are further illustrated by and described with reference to apparatus diagrams, system diagrams, and flowcharts that relate to a PUCCH design for eMTC communications in a shared or unlicensed radio frequency spectrum band (eMTC-U) design.

Figure 1:
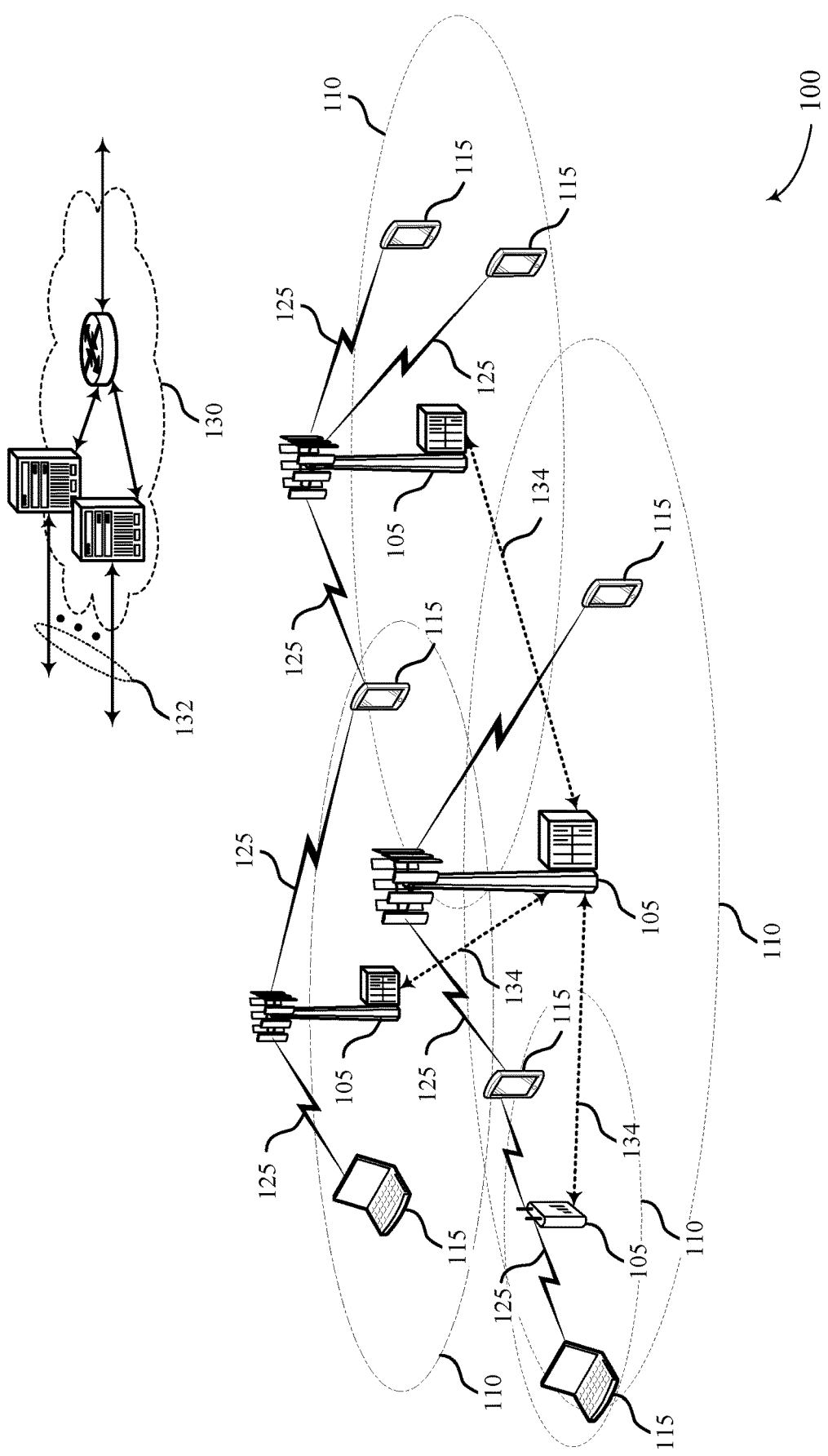
FIG. 1 illustrates an example of a wireless communications system that supports an eMTC-U PUCCH design in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. eMTC devices may build on MTC protocols and support lower bandwidths in the uplink or downlink, lower data rates, and reduced transmit power, culminating in significantly longer battery life (e.g., extending batter life for several years). References to an MTC may also refer to an eMTC configured device.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element (RE) may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme). Thus, the more REs that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may support aspects of the described techniques for eMTC PUCCH message design. For example, the base station 105 may select a payload size configuration for an MTC PUCCH message from a UE 115. The payload size configuration may include a maximum amount of data available for the MTC PUCCH message. The base station 105 may transmit a configuration message to the UE to indicate the payload size configuration. The base station 105 may receive the MTC PUCCH message from the UE 115 over a plurality of RBs One or more of the UEs 115 may support aspects of the described techniques for eMTC PUCCH message design. For example, the UE 115 may receive a configuration message indicating a payload size configuration for MTC PUCCH messages. The UE 115 may generate an MTC PUCCH message based at least in part on the payload size configuration and a PUCCH format of MTC uplink control information for transmission by the UE 115. The UE 115 may transmit the MTC PUCCH message over a plurality of RBs in a frequency domain.

Figure 2:
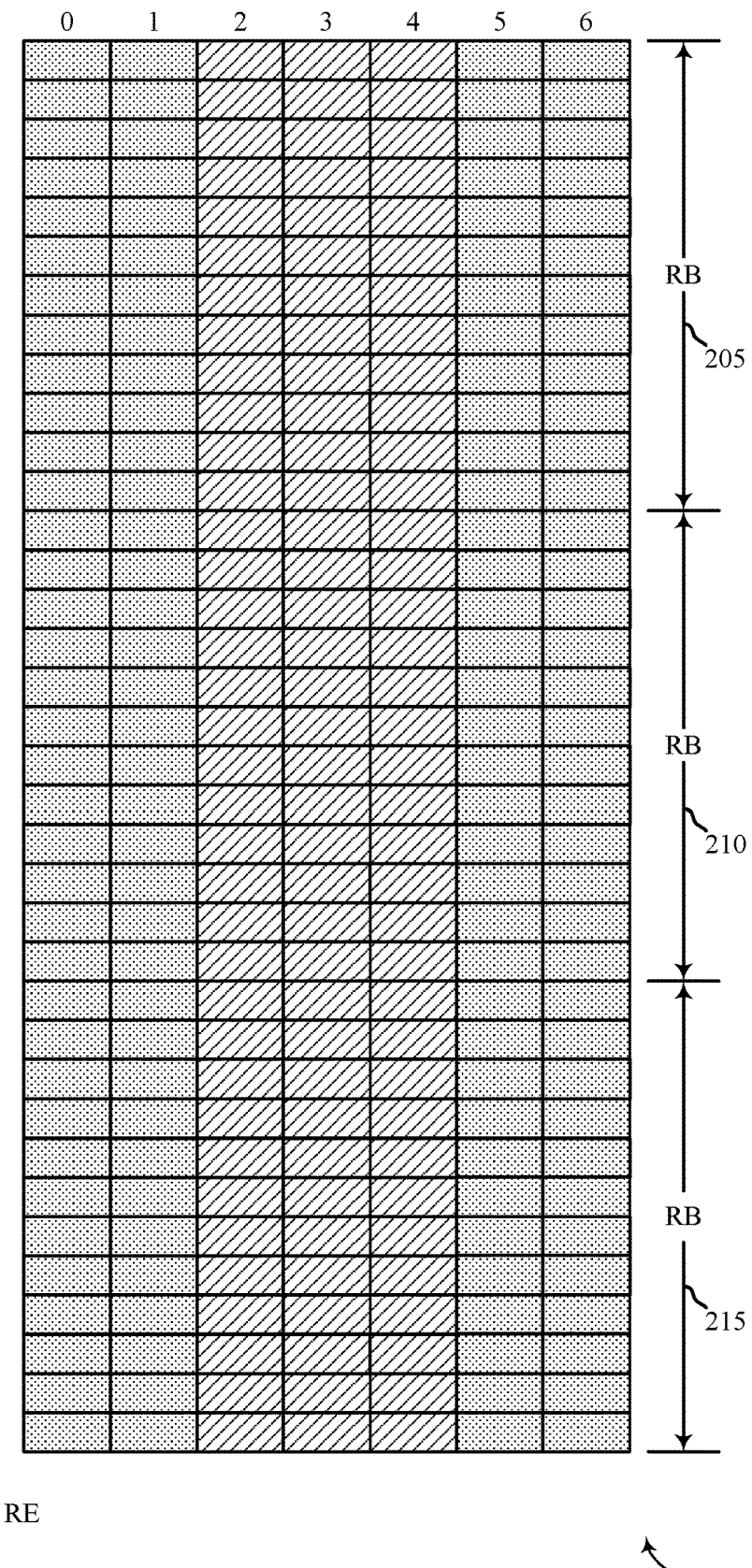
FIG. 2 illustrates an example of a payload configuration that supports an eMTC-U PUCCH design in accordance with aspects of the present disclosure.

FIG. 2 illustrates an example of a payload configuration 200 that supports an eMTC-U PUCCH design in accordance with various aspects of the present disclosure. In some examples, payload configuration 200 may implement aspects of wireless communications system 100. In some aspects, payload configuration 200 may be implemented by a UE and/or a base station, which may be examples of the corresponding devices described herein.

Payload configuration 200 may be an example of a payload size configuration selected by a base station for MTC PUCCH messages from a UE. For example, the base station may select the payload configuration 200 as the payload size configuration and transmit an indication of the payload size configuration to the UE in a configuration message (e.g., in an RRC message). Payload configuration 200 may include an MTC PUCCH message transmission that includes a plurality of reference signal REs (e.g., demodulation reference signals (DMRSs)), as well as data REs. Payload configuration 200 may support the UE transmitting the MTC PUCCH message over a plurality of RBs, with three RBs 205, 210, and 215 being shown by way of a non-limiting example. However, the payload configuration 200 is not limited to three RBs and may have more than three RBs. Each of the RBs 205, 210, and 215 may include seven symbol periods (labeled 0-6), but may have more or less symbol periods.

In some aspects, payload configuration 200 includes at least three RBs to support MTC PUCCH message transmissions on a 2.4 GHz ISM band. For example, each of RBs 205, 210, and 215 may have a corresponding bandwidth of 180 kHz and payload configuration 200 may include three RBs 205, 210, and 215 having a cumulative bandwidth of at least 500 kHz. The RBs 205, 210, and 215 may therefore comply with a minimum bandwidth of the radio frequency band and may be used for MTC PUCCH message communications.

In some aspects, payload configuration 200 may be associated with a PUCCH format 1 (e.g., a machine PUCCH (mPUCCH) format 1). The PUCCH format 1 may include communicating a scheduling request, HARQ feedback, and the like. Here, symbol periods 0, 1, 5, and 6 contain data REs while symbol periods 2, 3, and 4 contain reference signal REs. However, the payload configuration 200 may not be limited to this number or configuration of data and reference signal REs. In some cases, payload configuration 200 may be configured for at least two options supporting MTC PUCCH messages in the radio frequency band.

In a first option, payload configuration 200 may support frequency domain concatenation. The reference signal REs (e.g., the DMRS waveform) may be repeated across each of RBs 205, 210 and 215. In some cases, a cover code (e.g., an orthogonal cover code (OCC)) of length three may be applied to the reference signals. Additionally or alternatively, a cyclic shift may be applied to the reference signals (e.g., a length-12 cyclic shift). In another example, a cover code and/or a cyclic shift may be applied to the data. In some aspects, an OCC cover code of length four may be applied to the data. In some other aspects, a length-12 cyclic shift may also be applied to the data.

In some aspects of the first option, the data REs (e.g., the data waveform) may include all length-12 computer generated sequences (CGSs) (e.g., base sequences) modulated by a data modulation symbol d(i) in each of the RBs 205, 210, and 215. In a first example and for a maximum payload, d(0) (e.g., the data symbol used to modulate the data in RB 205), d(1) (e.g., the data symbol used to modulate the data in RB 210), and d(2) (e.g., the data symbol used to modulate the data in RB 215) may be different. This may support payload configuration 200 transmitting six bits of data (e.g., not including channel selection). This example may be used to ACK/NACK multiple HARQ processes in a self-contained frame structure.

In another example and for maximal coverage, d(0), d(1), and d(2) may be the same. That is, the data in each of RBs 205, 210, and 215, may be modulated with the same data symbol. This may support payload configuration 200 transmitting two bits of data (e.g., not including channel selection), but the data being repeated across the different RBs. This may provide increased redundancy and coverage. Thus, the data waveforms of the second and third RBs (e.g., RBs 210 and 215) may be the same as the data waveform of the first RB (e.g., RB 205). In some aspects, the same resource index may be used across the three RBs 205, 210, and 215. MTC PUCCH message repetition may be required according to aspects of the first option.

In a second option, payload configuration 200 may include a sequence (e.g., a base sequence) being applied to both of the reference signals and data. For example, a single sequence (e.g., a sequence that doesn't repeat in the frequency domain over the RBs) may be applied to the reference signals across each of RBs 205, 210, and 215. In some cases, the single sequence may be a longer sequence when compared to a length-12 CGS (e.g., a Chu sequence). A cyclic shift of 12 may be applied to the reference signals and the data on a per-RB configuration. A length three cover code may be applied to the reference signals and a length four cover code may be applied to the data.

In some aspects of the second option, the sequence may be applied across all allocated RBs of the data. The data may be modulated by the same data symbol. Thus, payload configuration 200 according to the second option may carry two bits of data (e.g., not including the channel selection). In some aspects, payload configuration 200 may be used to multiplex up to 36 UEs (e.g., three RBs with a length-12 cyclic shift being used to multiplex up to 36 UEs). MTC PUCCH message repetition may not be required according to aspects of the second option.

Figure 3:
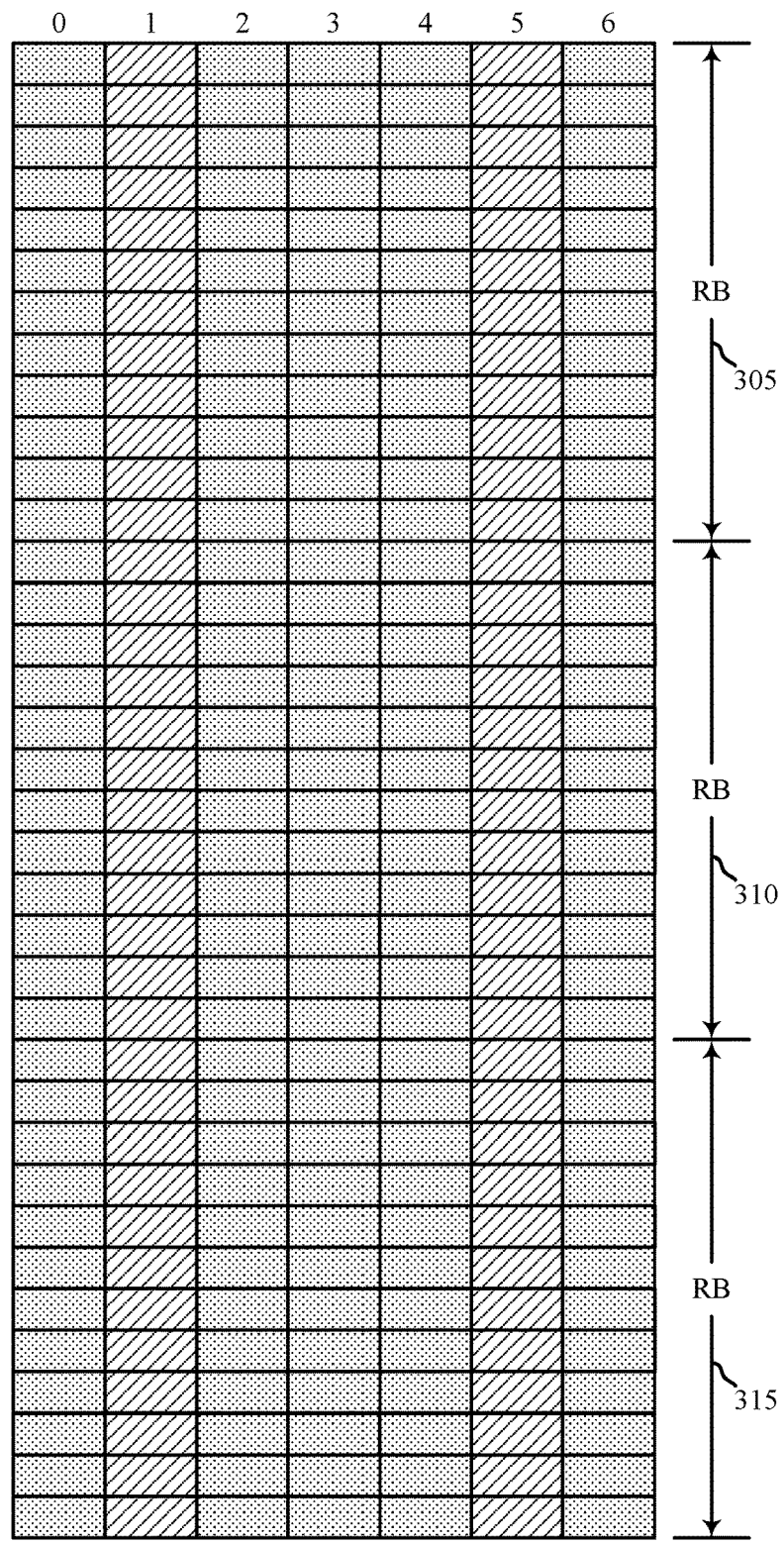
FIG. 3 illustrates an example of a payload configuration that supports an eMTC-U PUCCH design in accordance with aspects of the present disclosure.

FIG. 3 illustrates an example of a payload configuration 300 that supports an eMTC-U PUCCH design in accordance with various aspects of the present disclosure. In some examples, payload configuration 300 may implement aspects of wireless communications system 100. In some aspects, payload configuration 300 may be implemented by a UE and/or a base station, which may be examples of the corresponding devices described herein.

Payload configuration 300 may be an example of a payload size configuration selected by a base station for MTC PUCCH messages from a UE. For example, the base station may select the payload configuration 300 as the payload size configuration and transmit an indication of the payload size configuration to the UE in a configuration message (e.g., in an RRC message). Payload configuration 300 may include an MTC PUCCH message transmission that includes a plurality of reference signal REs (e.g., DMRS, as well as data REs). Payload configuration 300 may support the UE transmitting the MTC PUCCH message over a plurality of RBs, with three RBs 305, 310, and 315 being shown. However, the payload configuration 300 is not limited to three RBs and may have more than three RBs. Each of the RBs 305, 310, and 315 may include seven symbol periods (labeled 0-6), but may have more or less symbol periods.

In some aspects, payload configuration 300 includes at least three RBs to support MTC PUCCH message transmissions on a 2.4 GHz ISM band. For example, each of RBs 305, 310, and 315 may have a corresponding bandwidth of 180 kHz and payload configuration 300 may include three RBs 305, 310, and 315 having a cumulative bandwidth of at least 500 kHz. The RBs 305, 310, and 315 may therefore comply with a minimum bandwidth of the radio frequency band and may be used for MTC PUCCH message communications.

In some aspects, payload configuration 300 may be associated with a PUCCH format 2 (e.g., a mPUCCH format 2). The PUCCH format 2 may include communicating a scheduling request, HARQ feedback, channel quality indicators, and the like. Here, symbol periods 0, 2, 3, 4, and 6 contain data REs while symbol periods 1 and 5 contain reference signal REs. However, the payload configuration 300 may not be limited to this number or configuration of data and reference signal REs. In some cases, payload configuration 300 may be configured for at least two options supporting MTC PUCCH messages in the radio frequency band.

In a first option, payload configuration 300 may support frequency domain concatenation. The reference signal REs (e.g., the DMRS waveform) may be repeated across each of RBs 305, 310 and 315. In some aspects, a cover code (e.g., an OCC) of length two may be applied to the reference signals. In some aspects, a cyclic shift may also be applied to the reference signals (e.g., a length-12 cyclic shift). In some cases, a cover code and/or cyclic shift may be applied to the data. For example, an OCC cover code of length five and/or a length-12 cyclic shift may be applied to the data.

In some aspects of the first option, the data REs (e.g., the data waveform) may include all ten length-12 CGSs modulated by ten data modulation symbols d(i) in each of the RBs 305, 310, and 315. In one example and for a maximum payload, each group of ten data symbols in different RBs may be different. This may provide a total of 30 data symbols providing 60 bits of data payload. This may be used to ACK/NACK multiple HARQ processes in a self-contained frame structure and convey channel state information in multiple hopping frequencies.

In a second example and for maximal coverage, the ten data symbols in the different RBs may be the same. This may provide for ten data symbols providing 20 bits of data payload. Thus, the data waveforms in each of RBs 310 and 315 may be the same as the data waveform in RB 305. In some aspects, the same resource index may be used across the three RBs 305, 310, and 315. In some aspects of the first option, up to 12 UEs may be multiplexed according to payload configuration 300.

In a second option, payload configuration 300 may include a sequence being applied to the reference signals. For example, a single sequence (e.g., a sequence that doesn't repeat in the frequency domain over the RBs, such as a Chu sequence) may be applied to the reference signals across each of RBs 305, 310, and 315. A cyclic shift of 12 may be applied to the reference signals and the data on a per-RB configuration. A length two cover code may be applied to the reference signals and a length five cover code may be applied to the data.

In some aspects of the second option, the sequence may be applied across all allocated RBs of the data. For example, ten long sequences may be modulated by ten data modulation symbols. Thus, payload configuration 300 according to the second option may carry 20 bits of data (e.g., not including the channel selection). In some aspects, payload configuration 300 may be used to multiplex up to 12 UEs. MTC PUCCH message repetition may not be required according to aspects of the second option.

In some cases, payload configuration 300 may be associated with a PUCCH format 3 (e.g., a mPUCCH format 3). The PUCCH format 3 may include communicating using a frequency hopping scheme using 15 or more frequencies in eMTC-U. For example, the eMTC-U transmission may hop over 80 MHz in a 2.4 GHz ISM band. In some instances, the PUCCH format 3 may include additional bits to carry channel state information as compared to other eMTC protocols which may use fewer hopping frequencies (e.g., four hopping frequencies). The additional bits may be used to capture and carry interference and channel frequency variation (e.g., information used to update the white list and rate adaptation).

In some aspects of the PUCCH format 3, a reference signal may include a sequence (e.g., a single Chu sequence) being applied across all allocated RBs 305, 310, and 315. A length-12 cyclic shift may be applied to the reference signals on a per RB basis. A length two cover code (e.g., OCC) may be applied over two reference signal symbols per slot (e.g., all allocated RBs).

In some aspects of the PUCCH format 3, the data waveform may have a length five cover code applied over five data symbols per slot (e.g., all allocated RBs). One data symbol may be applied per tone per slot, giving 72 data symbols for one subframe. This may support up to 144 data bits being carried in the payload configuration 300. The same resource index may be used across all allocated RBs. Payload configuration 300 may be configured to multiplex up to five UEs. MTC PUCCH message repetition may not be required according to certain aspects of the PUCCH format three.

Figure 4:
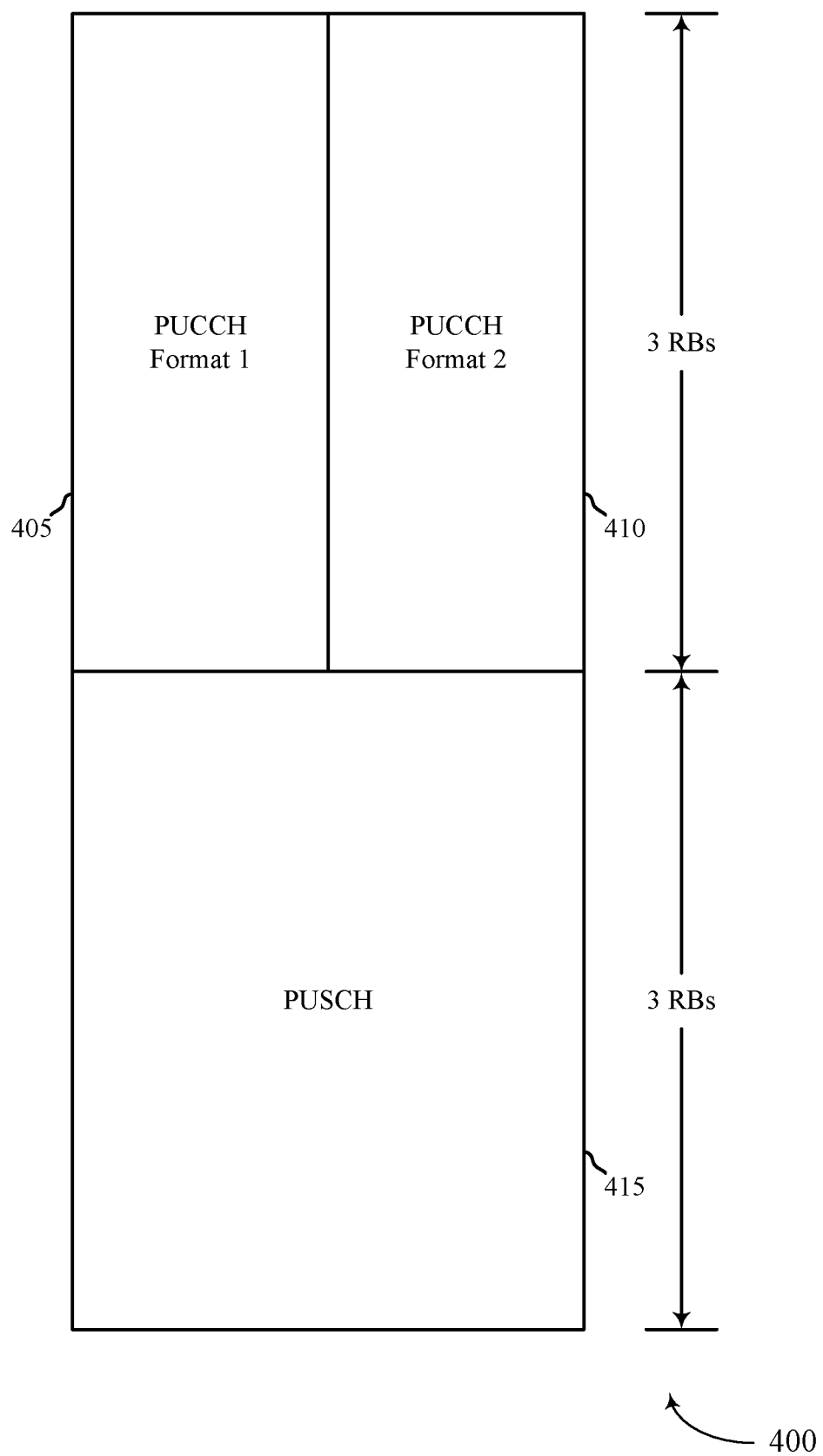
FIG. 4 illustrates an example of a payload configuration that supports an eMTC-U PUCCH design in accordance with aspects of the present disclosure.

FIG. 4 illustrates an example of a payload configuration 400 that supports an eMTC-U PUCCH design in accordance with various aspects of the present disclosure. In some examples, payload configuration 400 may implement aspects of wireless communications system 100. In some aspects, payload configuration 400 may be implemented by a UE and/or a base station, which may be examples of the corresponding devices described herein.

Payload configuration 400 may be an example of a payload size configuration selected by a base station for MTC PUCCH messages from a UE. For example, the base station may select the payload configuration 400 as the payload size configuration and transmit an indication of the payload size configuration to the UE in a configuration message (e.g., in an RRC message). Payload configuration 400 may support the UE transmitting the MTC PUCCH message over a plurality of RBs, with three RBs being shown by way of a non-limiting example. However, the payload configuration 400 is not limited to three RBs and may have more than three RBs. In some aspects, payload configuration 400 includes at least three RBs to support MTC PUCCH message transmissions on a 2.4 GHz ISM band.

In some aspects, payload configuration 400 may include multiplexing of PUCCH format 1 and 2 (e.g., format 1 405 and format 2 410). That is, UEs may use TDM techniques for eMTC-U PUCCH transmissions and therefore less PUCCH capacity may be used for a given subframe. PUCCH format 1 405 may carry ACK/NACK feedback and a scheduling request. PUCCH format 2 410 may be used to carry ACK/NACK feedback, a scheduling request, and a periodic channel state information. Multiplexing of the PUCCH format 1 405 and PUCCH format 2 410 may be helpful, for example, when certain UEs have ACK/NACK feedback to send and other UEs have periodic channel state information to send. The multiplexed PUCCH format may occupy three RBs over a six RB bandwidth allocation, with the remaining three RBs being allocated to physical uplink shared channel (PUSCH) 415.

That is, the multiplexed PUCCH format (e.g., format 1 405 and format 410) may occupy three RBs and the remaining three RBs may be occupied by the PUSCH 415 (e.g., a first subset of RBs allocated to the MTC PUCCH message and a second subset of RBs allocated to PUSCH message(s)). The enhanced format 1 405 and format 2 410 may share the same three RBs, but use different cyclic shifts (e.g., a first subset of cyclic shifts applied to the first subset of RBs for the PUCCH format 1 and a second subset of cyclic shifts applied to the first subset of RBs for the PUCCH format 2). In one example, 12 cyclic shifts total may include $N_{CS}^{(1)}$ cyclic shifts allocated for format 1 405, a δ guard cyclic shift, and $12-\delta-N_{CS}^{(1)}$ cyclic shifts allocated to format 2 410. In some aspects, format 1 405 and format 2 410 may have the same or different reference signal/data symbol locations, may use the same sequence (e.g., a base sequence that may be either a long base sequence such as a single Chu sequence or short base sequence such as a length-12 CGS), and both reference signal and data symbol may be the same across all allocated RBs (e.g., may use any of the options discussed above with reference to payload configurations 200 and/or 300).

In some aspects, the multiplexing capacity for payload configuration 400 may be determined as follows. A multiplexing capacity associated with format 1 405 may be determined by $$N_{CS}^{(1)} \cdot \frac{3}{\Delta},$$

where Δ refers to the minimum cyclic shift gap. A multiplexing capacity associated with format 2 410 may be determined by $$\frac{12 - N_{CS}^{(1)} - \delta}{\Delta}.$$

Figure 5:
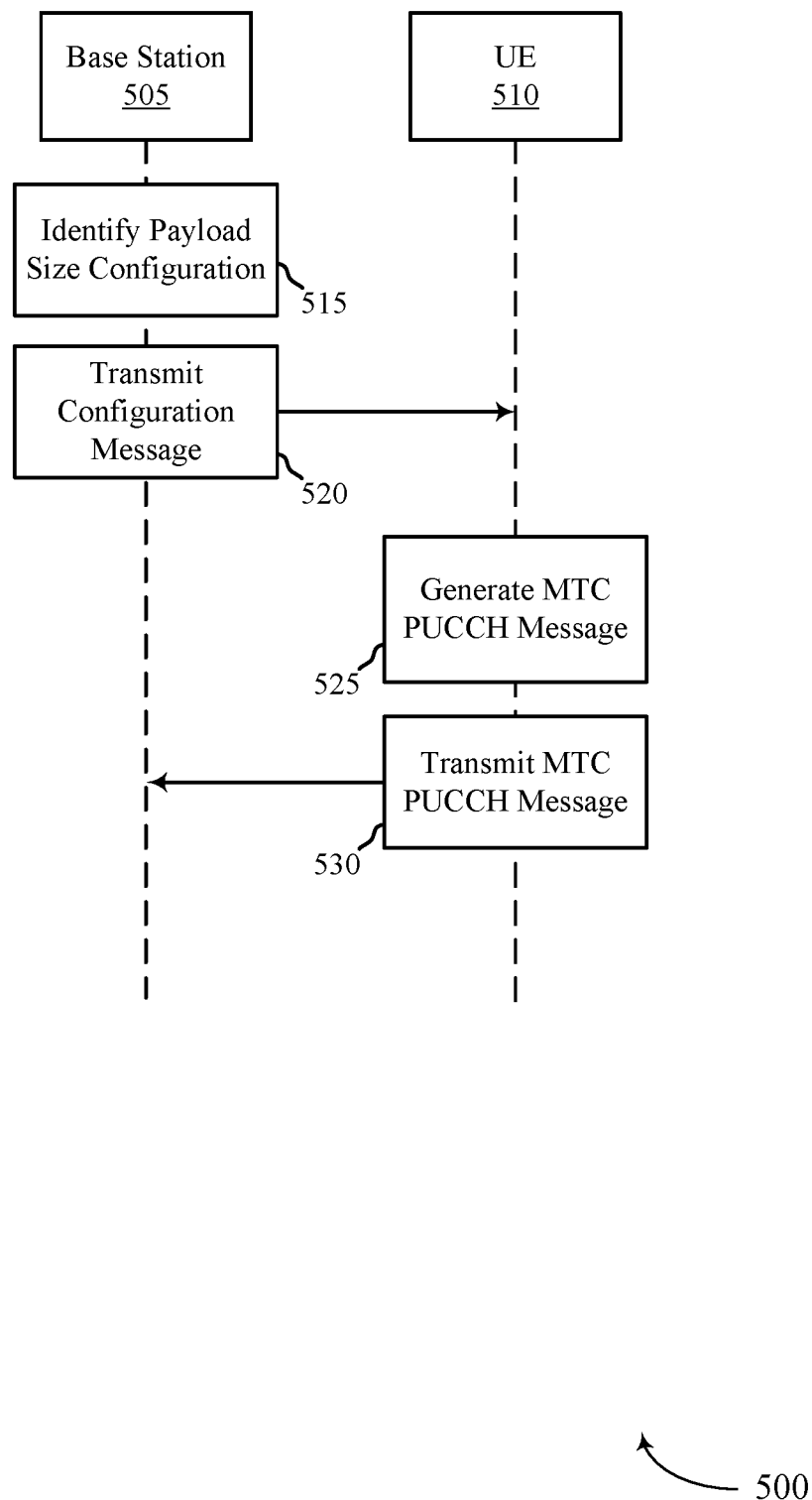
FIG. 5 illustrates an example of a process that supports an eMTC-U PUCCH design in accordance with aspects of the present disclosure.

FIG. 5 illustrates an example of a process 500 that supports an eMTC-U PUCCH design in accordance with various aspects of the present disclosure. In some examples, process 500 may implement aspects of wireless communications system 100 and/or payload configurations 200, 300 and/or 400. Process 500 may include a base station 505 and a UE 510, which may be examples of the corresponding devices described herein.

At 515, base station 505 may select or otherwise identify a payload size configuration for an MTC PUCCH message from UE 510. The payload size configuration may include a maximum amount of data available for the MTC PUCCH message. The payload size configuration may be an example of the payload configuration 200, 300, and/or 400.

At 520, base station 505 may transmit (and UE 510 may receive) a configuration message to UE 510 that indicates the payload size configuration. The configuration message may be transmitted in an RRC message, in some examples.

At 525, UE 510 may generate an MTC PUCCH message based on the payload size configuration indicated from base station 505 and a PUCCH format of MTC uplink control information for transmission by UE 510. For example, the MTC PUCCH message may be generated based on whether the PUCCH format is a format 1, format 2, format 3, or hybrid format 1/2, as is discussed above.

At 530, UE 510 may transmit (and base station 505 may receive) the MTC PUCCH message across a plurality of RBs in the frequency domain. For example, the MTC PUCCH message may be transmitted across three RBs.

Figure 6:
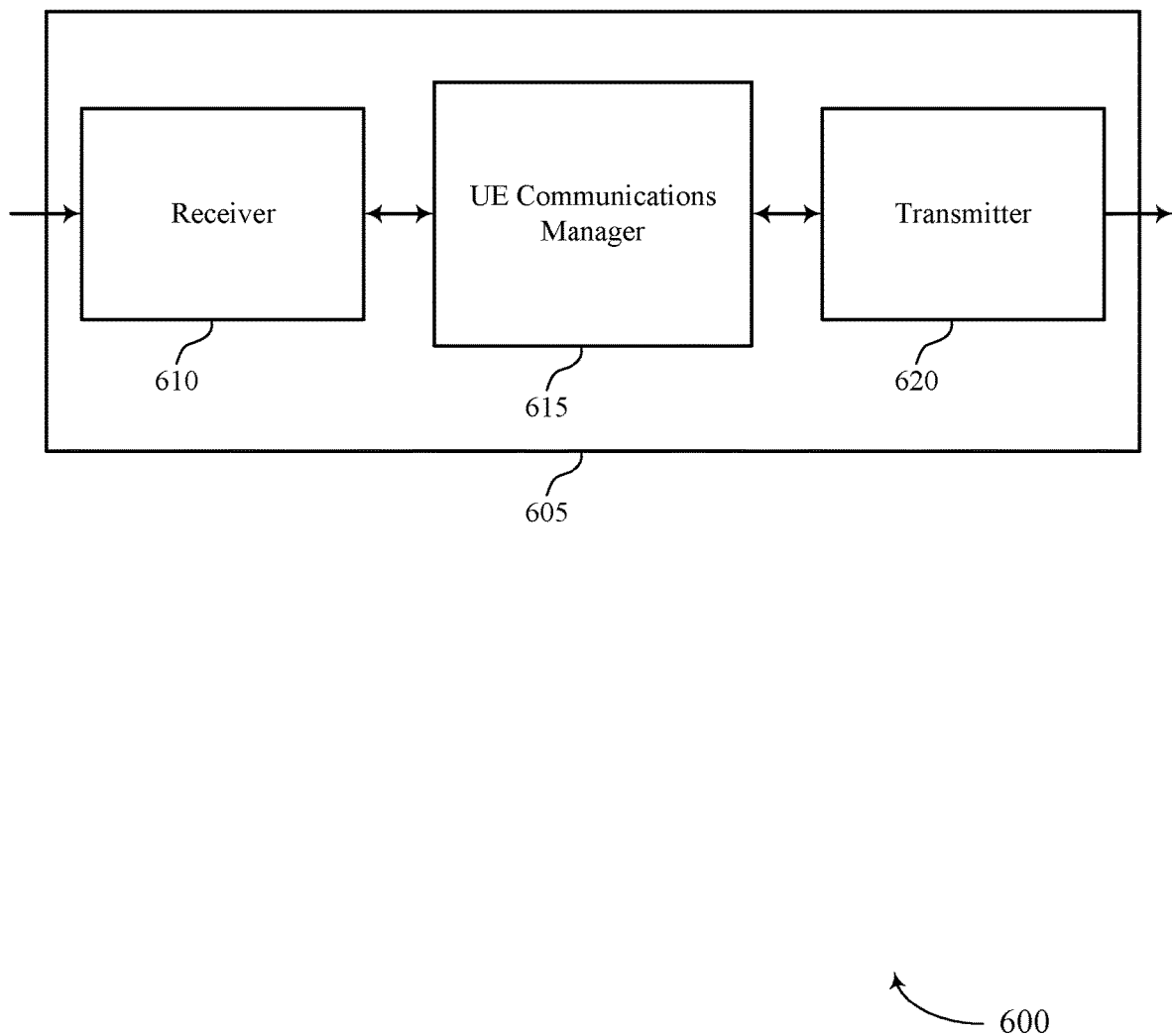
FIGS. 6 through 8 show block diagrams of a device that supports an eMTC-U PUCCH design in accordance with aspects of the present disclosure.

FIG. 6 shows a block diagram 600 of a wireless device 605 that supports an eMTC-U PUCCH design in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to eMTC-U PUCCH design, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive, at a UE, a configuration message indicating a payload size configuration for MTC PUCCH messages. UE communications manager 615 may generate an MTC PUCCH message based on the payload size configuration and a PUCCH format of MTC uplink control information for transmission by the UE.

UE communications manager 615 may transmit the MTC PUCCH message over a set of RBs in a frequency domain.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
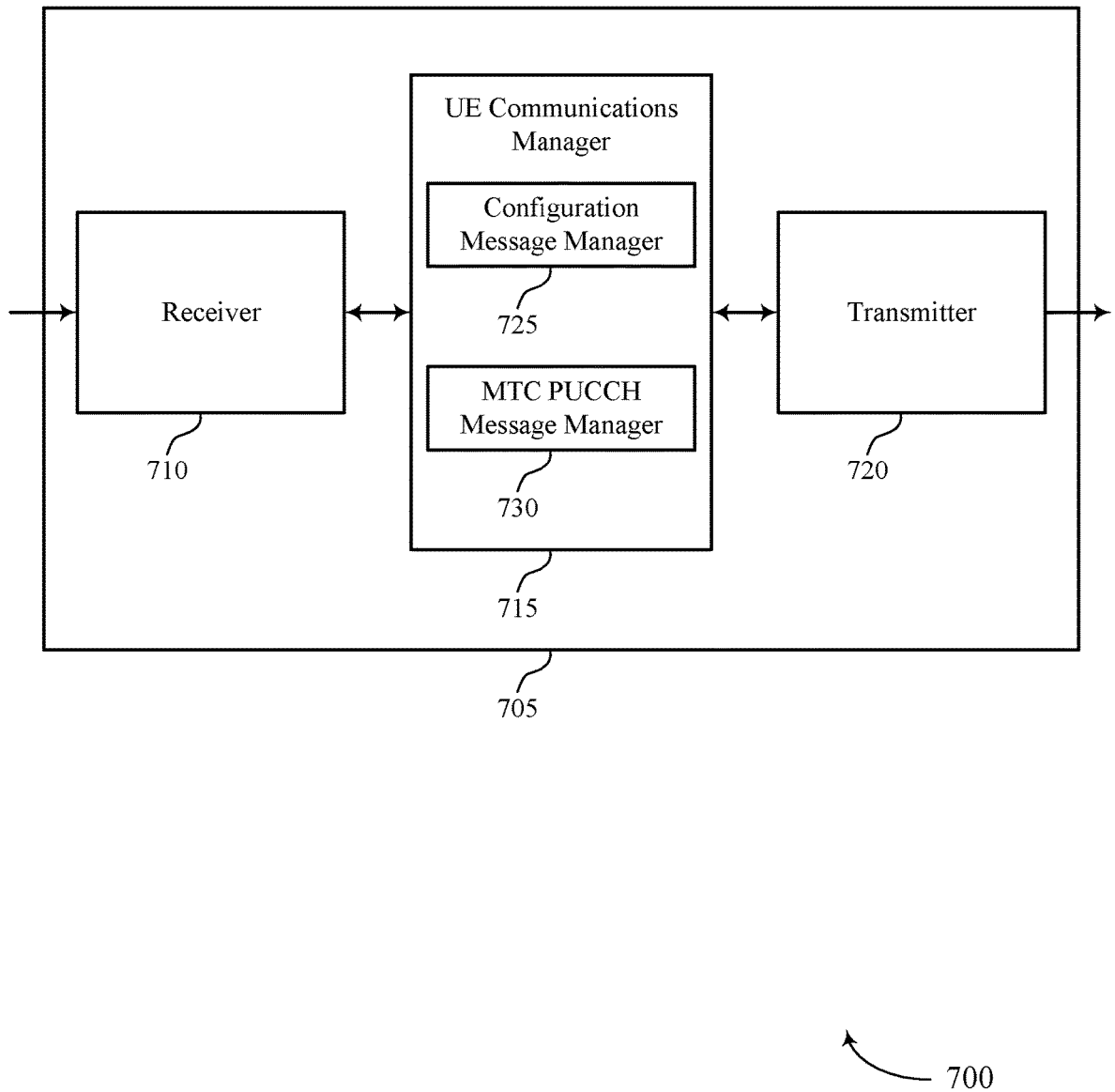

FIG. 7 shows a block diagram 700 of a wireless device 705 that supports an eMTC-U PUCCH design in accordance with aspects of the present disclosure. Wireless device 705 may be an example of aspects of a wireless device 605 or a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to eMTC-U PUCCH design, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include configuration message manager 725 and MTC PUCCH message manager 730.

Configuration message manager 725 may receive, at a UE, a configuration message indicating a payload size configuration for MTC PUCCH messages.

MTC PUCCH message manager 730 may generate an MTC PUCCH message based on the payload size configuration and a PUCCH format of MTC uplink control information for transmission by the UE and transmit the MTC PUCCH message over a set of RBs in a frequency domain.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
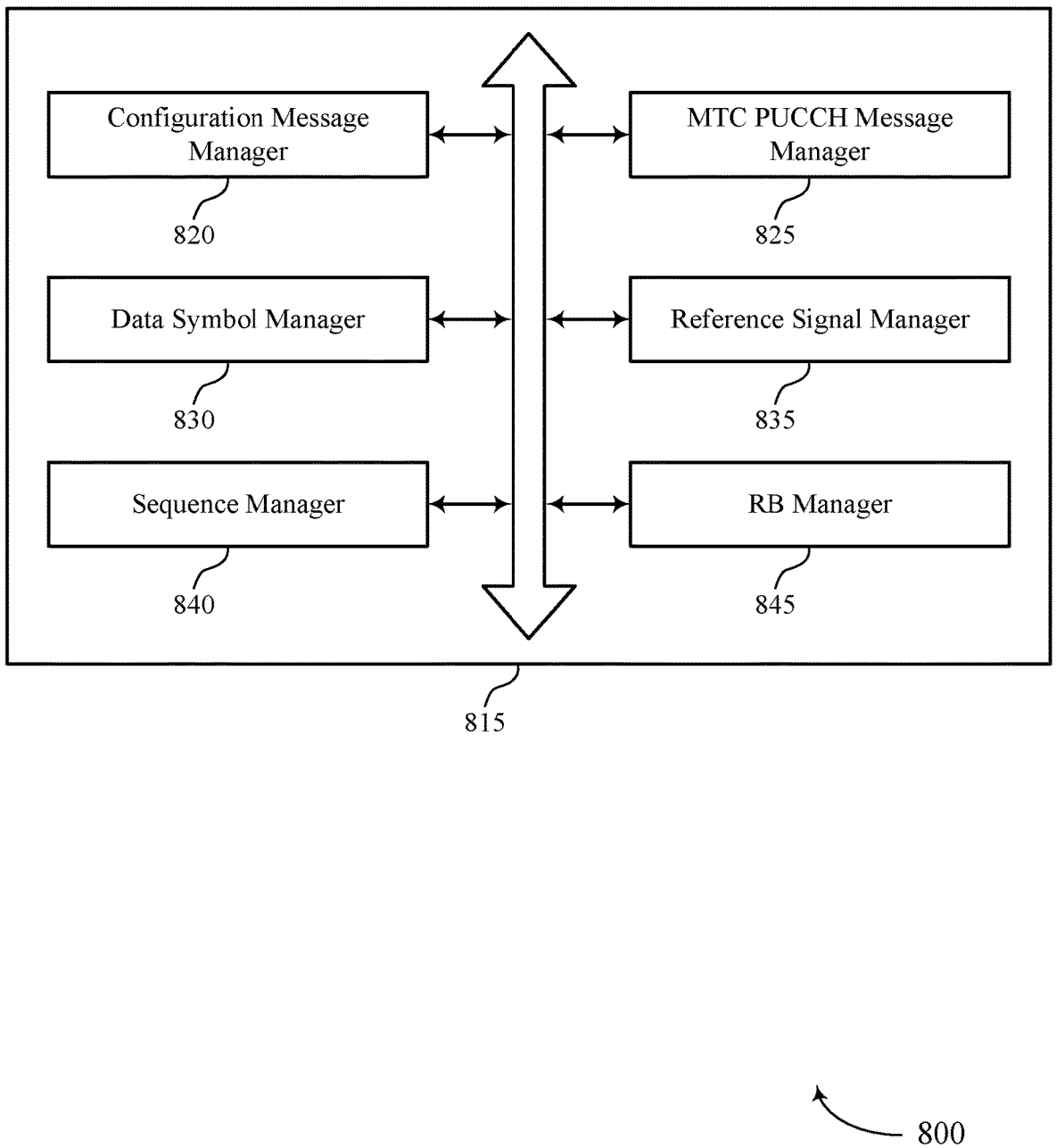

FIG. 8 shows a block diagram 800 of a UE communications manager 815 that supports an eMTC-U PUCCH design in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include configuration message manager 820, MTC PUCCH message manager 825, data symbol manager 830, reference signal manager 835, sequence manager 840, and RB manager 845. Each of these modules may communicate, directly or indirectly, with one another (e.g., via one or more buses).

Configuration message manager 820 may receive, at a UE, a configuration message indicating a payload size configuration for MTC PUCCH messages.

MTC PUCCH message manager 825 may generate an MTC PUCCH message based on the payload size configuration and a PUCCH format of MTC uplink control information for transmission by the UE and transmit the MTC PUCCH message over a set of RBs in a frequency domain.

Data symbol manager 830 may identify, based on the payload size configuration, a data symbol to use for modulating data bits in a CGS of an RB of the set of RBs. Data symbol manager 830 may modulate each CGS of the RB, where each CGS of the RB is modulated with a different data symbol. Data symbol manager 830 may modulate each CGS of the RB, where each CGS of the RB is modulated with a same data symbol.

Reference signal manager 835 may repeat a reference signal in the set of RBs of the MTC PUCCH message.

Sequence manager 840 may apply, for the UE, a sequence to different tones of the set of RBs of the MTC PUCCH message, where the sequence is non-repeating in a frequency domain over the set of RBs. Sequence manager 840 may apply, for the UE, a same cyclic shift to each of the set of RBs of the MTC PUCCH message. Sequence manager 840 may apply, for the UE, a same cover code to different symbol periods in each of the set of RBs of the MTC PUCCH message. In some cases, the sequence includes a Chu sequence.

RB manager 845 may allocate, based on the payload size configuration, a first subset of RBs of the set of RBs for the MTC PUCCH message and a second subset of RBs of the set of RBs for a PUSCH message. RB manager 845 may apply a first sequence to the first subset of RBs according to a first PUCCH format and apply a second sequence to the first subset of RBs according to a second PUCCH format, where the first sequence is from the same as the second sequence. RB manager 845 may apply a first cyclic shift to a first portion of the first subset of RBs and apply a second cyclic shift to a second portion of the first subset of RBs, where the first cyclic shift is different from the second cyclic shift. RB manager 845 may use different reference signal and data symbol location configuration for a first portion of the first subset of RBs and a second portion of the first subset of RBs. RB manager 845 may use a same base sequence for a first portion of the first subset of RBs and a second portion of the first subset of RBs. RB manager 845 may configure a first portion of the first subset of RBs and a second portion of the first subset of RBs to use a same data symbol.

Figure 9:
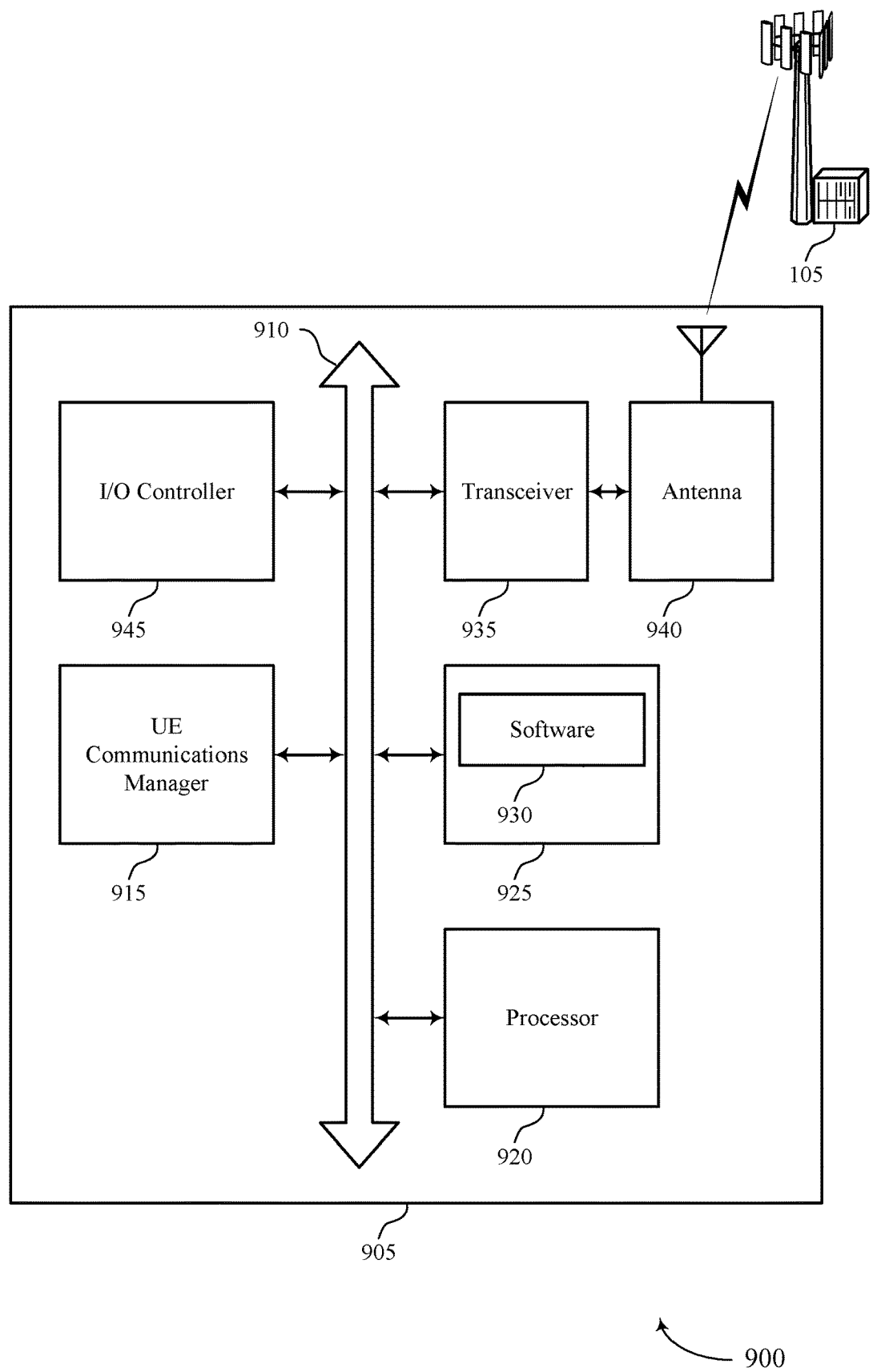
FIG. 9 illustrates a block diagram of a system including a UE that supports an eMTC-U PUCCH design in accordance with aspects of the present disclosure.

FIG. 9 shows a diagram of a system 900 including a device 905 that supports an eMTC-U PUCCH design in accordance with aspects of the present disclosure. Device 905 may be an example of or include the components of wireless device 605, wireless device 705, or a UE 115 as described herein. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting eMTC-U PUCCH design).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support eMTC-U PUCCH design. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
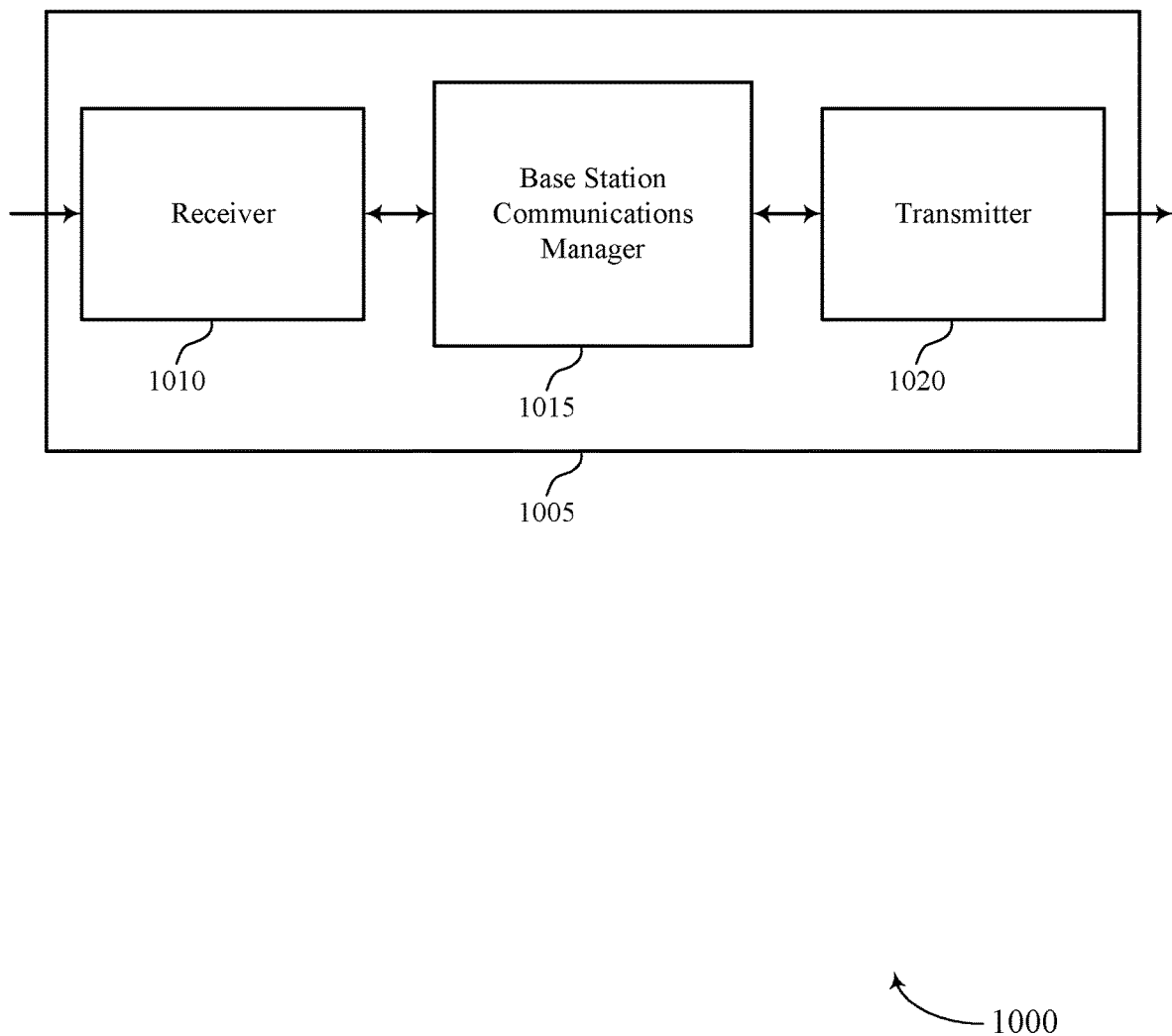
FIGS. 10 through 12 show block diagrams of a device that supports an eMTC-U PUCCH design in accordance with aspects of the present disclosure.

FIG. 10 shows a block diagram 1000 of a wireless device 1005 that supports an eMTC-U PUCCH design in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to eMTC-U PUCCH design, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may select a payload size configuration for an MTC PUCCH message from a UE, the payload size configuration including a maximum amount of data available for the MTC PUCCH message. Base station communications manager 1015 may transmit a configuration message to the UE to indicate the payload size configuration. Base station communications manager 1015 may receive the MTC PUCCH message from the UE over a set of RBs.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
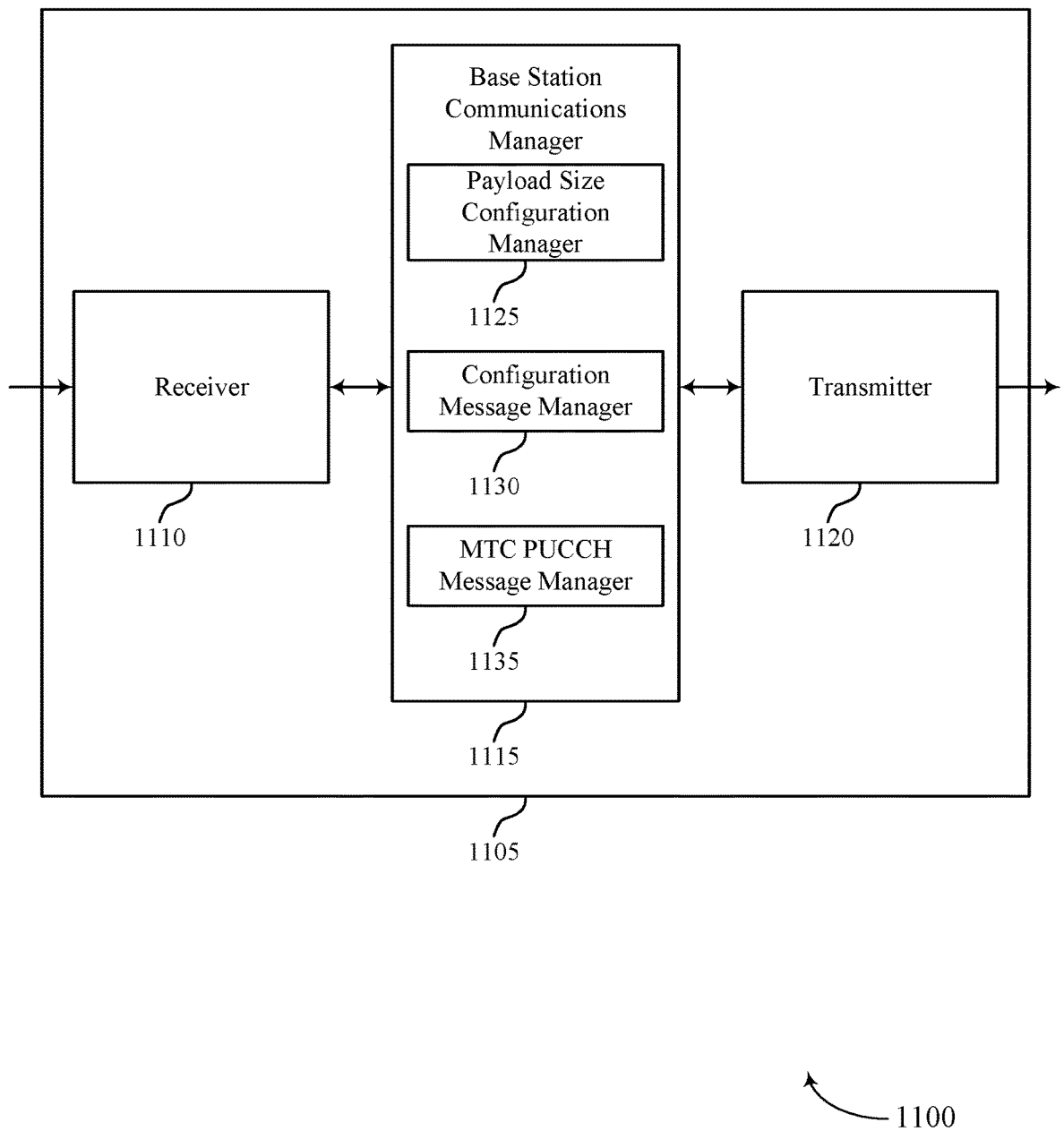

FIG. 11 shows a block diagram 1100 of a wireless device 1105 that supports an eMTC-U PUCCH design in accordance with aspects of the present disclosure. Wireless device 1105 may be an example of aspects of a wireless device 1005 or a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to eMTC-U PUCCH design, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include payload size configuration manager 1125, configuration message manager 1130, and MTC PUCCH message manager 1135.

Payload size configuration manager 1125 may select a payload size configuration for an MTC PUCCH message from a UE, the payload size configuration including a maximum amount of data available for the MTC PUCCH message.

Configuration message manager 1130 may transmit a configuration message to the UE to indicate the payload size configuration.

MTC PUCCH message manager 1135 may receive the MTC PUCCH message from the UE over a set of RBs.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
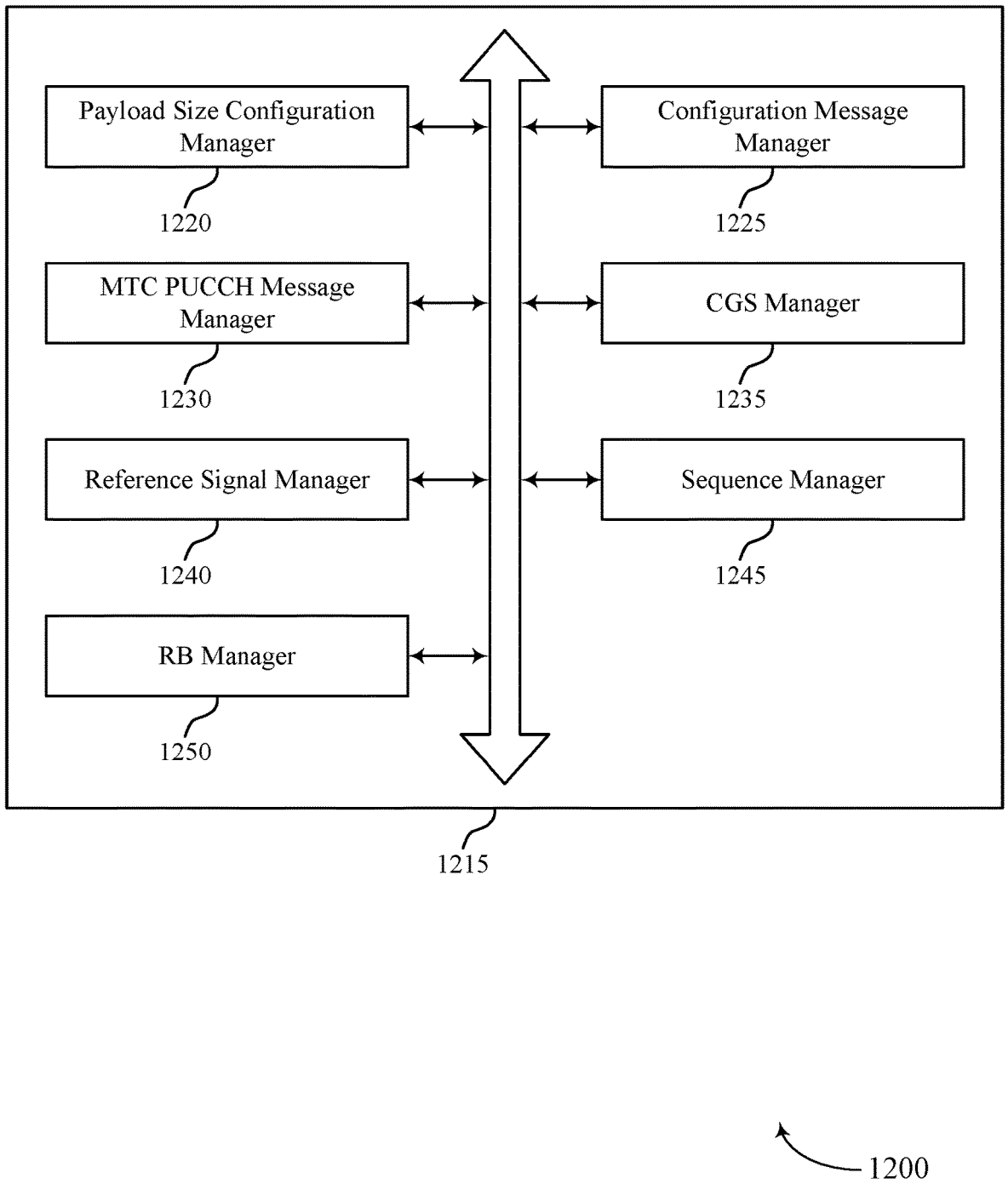

FIG. 12 shows a block diagram 1200 of a base station communications manager 1215 that supports an eMTC-U PUCCH design in accordance with aspects of the present disclosure. The base station communications manager 1215 may be an example of aspects of a base station communications manager 1315 described with reference to FIGS. 10, 11, and 13. The base station communications manager 1215 may include payload size configuration manager 1220, configuration message manager 1225, MTC PUCCH message manager 1230, CGS manager 1235, reference signal manager 1240, sequence manager 1245, and RB manager 1250. Each of these modules may communicate, directly or indirectly, with one another (e.g., via one or more buses).

Payload size configuration manager 1220 may select a payload size configuration for an MTC PUCCH message from a UE, the payload size configuration including a maximum amount of data available for the MTC PUCCH message.

Configuration message manager 1225 may transmit a configuration message to the UE to indicate the payload size configuration.

MTC PUCCH message manager 1230 may receive the MTC PUCCH message from the UE over a set of RBs.

CGS manager 1235 may demodulate each CGS of the set of RBs of the MTC PUCCH message, where each CGS of the RB is modulated with a different data symbol. CGS manager 1235 may demodulate each CGS of the set of RBs of the MTC PUCCH message, where each CGS of the RB is modulated with a same data symbol.

Reference signal manager 1240 may receive a reference signal in the set of RBs of the MTC PUCCH message, where the reference signal is repeated in the set of RBs.

Sequence manager 1245 may recover each of the set of RBs of the MTC PUCCH message using a sequence applied to different tones of the set of RBs of the PUCCH message, where the sequence is non-repeating over the set of RBs. Sequence manager 1245 may reverse cyclically shifting, for the UE, each of the set of RBs of the MTC PUCCH message using a same cyclic shift code. Sequence manager 1245 may recover each of the set of RBs of the MTC PUCCH message using a same cover code.

RB manager 1250 may identify, based on the payload size configuration, a first subset of RBs of the set of RBs for the MTC PUCCH message and a second subset of RBs of the set of RBs for a PUSCH message. RB manager 1250 may identify a first subset of cyclic shifts applied to the first subset of RBs according to a first PUCCH format (e.g., PUCCH format 1) and identify a second subset of cyclic shifts applied to the first subset of RBs according to a second PUCCH format (e.g., PUCCH format 2). RB manager 1250 may recover a first portion of the first subset of RBs using a first cyclic shift and recover a second portion of the first subset of RBs using a second cyclic shift, where the first cyclic shift is different from the second cyclic shift. RB manager 1250 may recover, according to a different reference signal and data symbol location configuration, a first portion of the first subset of RBs and a second portion of the first subset of RBs. RB manager 1250 may recover, according to a same base sequence, a first portion of the first subset of RBs and a second portion of the first subset of RBs. RB manager 1250 may recover, according to a same data symbol, a first portion of the first subset of RBs and a second portion of the first subset of RBs.

Figure 13:
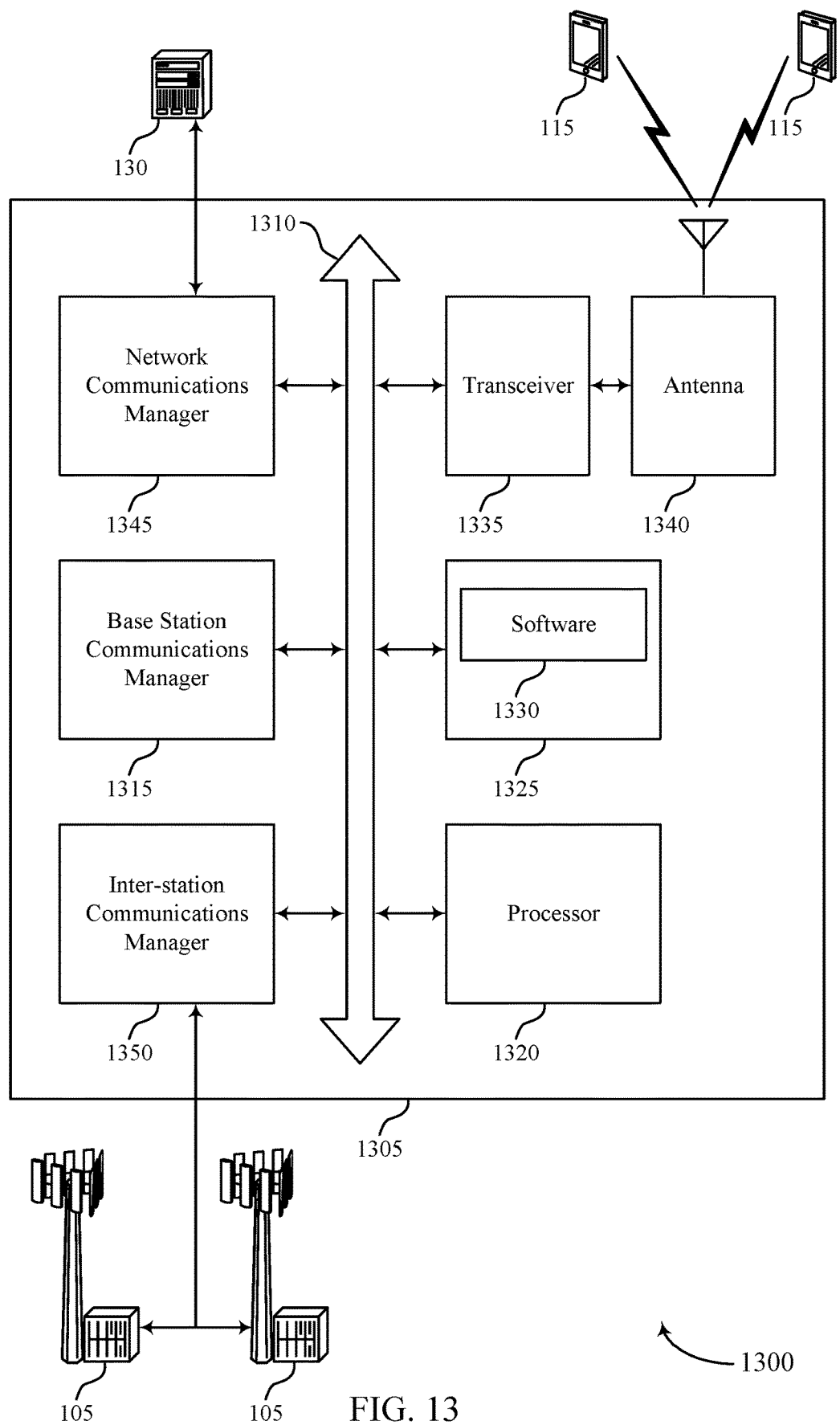
FIG. 13 illustrates a block diagram of a system including a base station that supports an eMTC-U PUCCH design in accordance with aspects of the present disclosure.

FIG. 13 shows a diagram of a system 1300 including a device 1305 that supports an eMTC-U PUCCH design in accordance with aspects of the present disclosure. Device 1305 may be an example of or include the components of base station 105 as described above (e.g., with reference to FIG. 1). Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting eMTC-U PUCCH design).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support eMTC-U PUCCH design. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
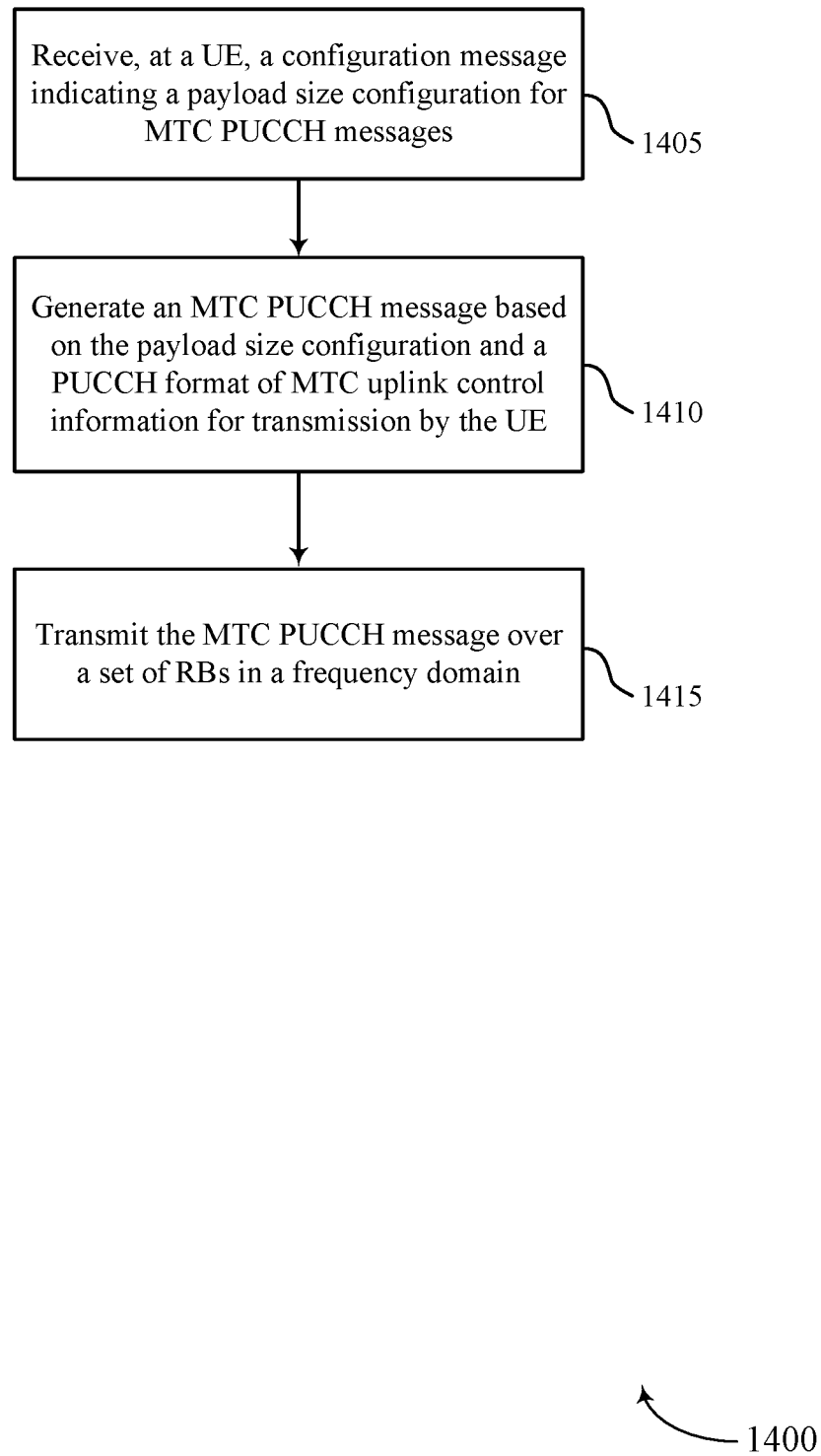
FIGS. 14 through 17 illustrate methods for wireless communications in accordance with aspects of the present disclosure.

FIG. 14 shows a flowchart illustrating a method 1400 for wireless communications in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive, at a UE, a configuration message indicating a payload size configuration for MTC PUCCH messages. The operations of block 1405 may be performed according to the methods described herein. In certain examples, aspects of the operations of block 1405 may be performed by a configuration message manager as described with reference to FIGS. 6 through 9.

At block 1410 the UE 115 may generate an MTC PUCCH message based at least in part on the payload size configuration and a PUCCH format of MTC uplink control information for transmission by the UE. The operations of block 1410 may be performed according to the methods described herein. In certain examples, aspects of the operations of block 1410 may be performed by an MTC PUCCH message manager as described with reference to FIGS. 6 through 9.

At block 1415 the UE 115 may transmit the MTC PUCCH message over a plurality of RBs in a frequency domain. The operations of block 1415 may be performed according to the methods described herein. In certain examples, aspects of the operations of block 1415 may be performed by an MTC PUCCH message manager as described with reference to FIGS. 6 through 9.

Figure 15:
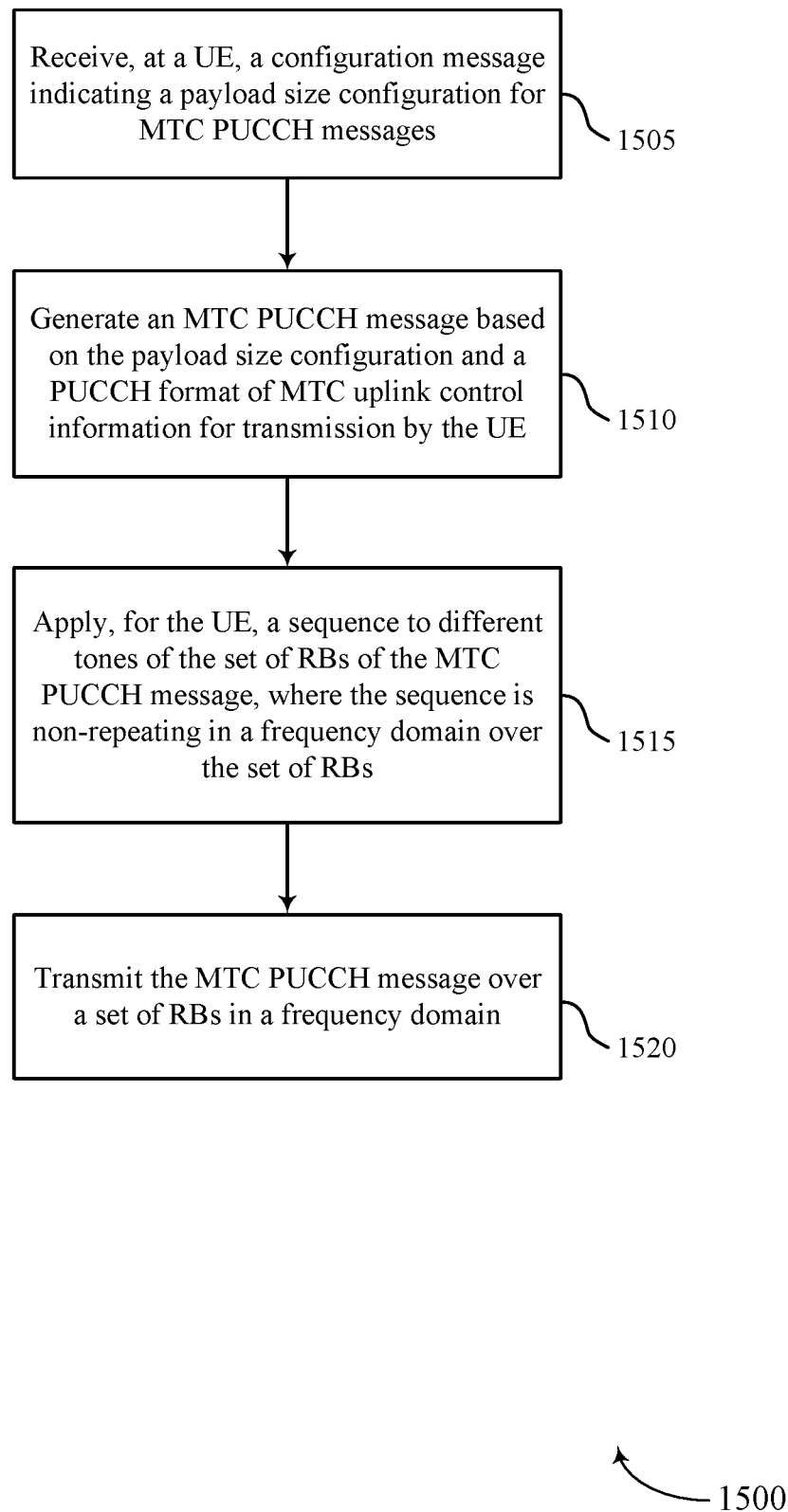

FIG. 15 shows a flowchart illustrating a method 1500 for wireless communications in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, at a UE, a configuration message indicating a payload size configuration for MTC PUCCH messages. The operations of block 1505 may be performed according to the methods described herein. In certain examples, aspects of the operations of block 1505 may be performed by a configuration message manager as described with reference to FIGS. 6 through 9.

At block 1510 the UE 115 may generate an MTC PUCCH message based at least in part on the payload size configuration and a PUCCH format of MTC uplink control information for transmission by the UE. The operations of block 1510 may be performed according to the methods described herein. In certain examples, aspects of the operations of block 1510 may be performed by an MTC PUCCH message manager as described with reference to FIGS. 6 through 9.

At block 1515 the UE 115 may apply, for the UE, a sequence to different tones of the plurality of RBs of the MTC PUCCH message, where the sequence is non-repeating in a frequency domain over the plurality of RBs. The operations of block 1515 may be performed according to the methods described herein. In certain examples, aspects of the operations of block 1515 may be performed by a sequence manager as described with reference to FIGS. 6 through 9.

At block 1520 the UE 115 may transmit the MTC PUCCH message over a plurality of RBs in a frequency domain. The operations of block 1520 may be performed according to the methods described herein. In certain examples, aspects of the operations of block 1520 may be performed by an MTC PUCCH message manager as described with reference to FIGS. 6 through 9.

Figure 16:
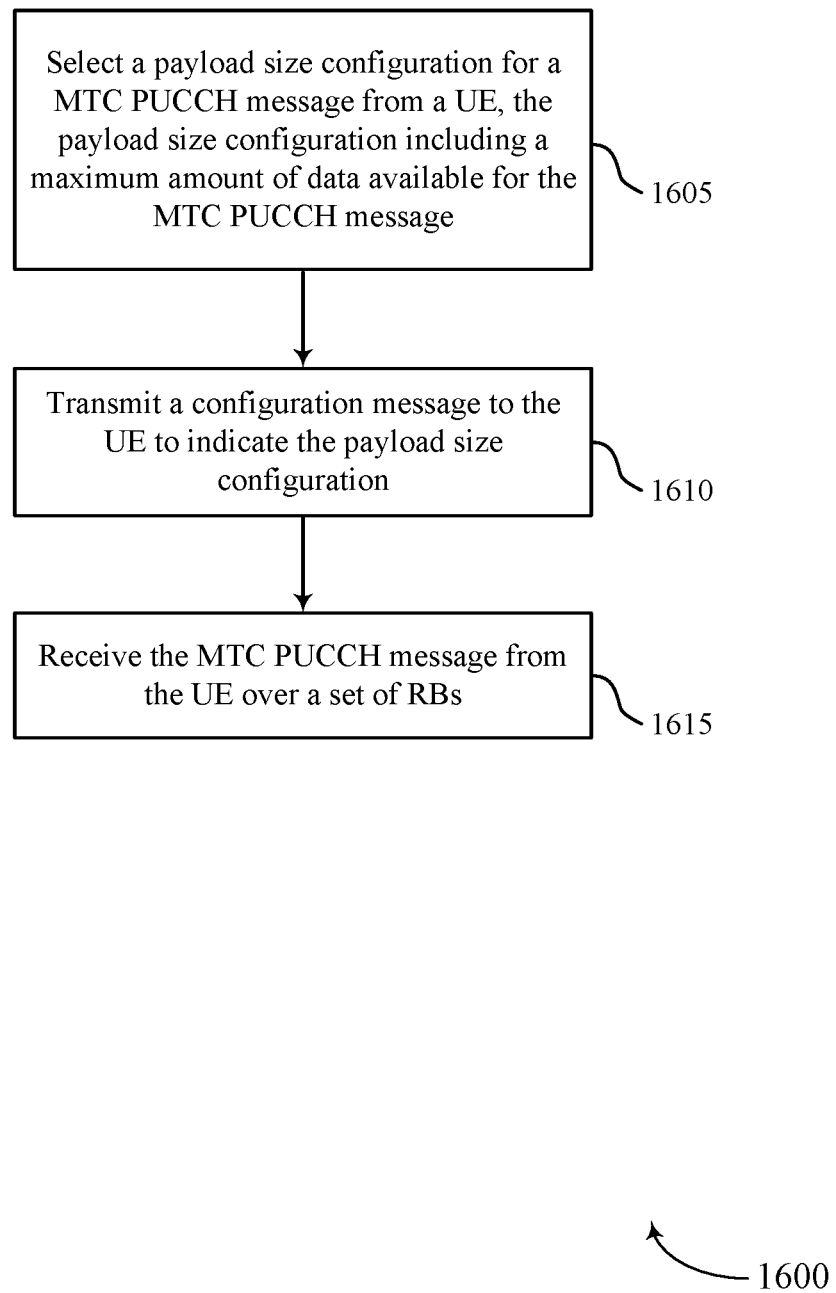

FIG. 16 shows a flowchart illustrating a method 1600 for wireless communications in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may select a payload size configuration for an MTC PUCCH message from a UE, the payload size configuration including a maximum amount of data available for the MTC PUCCH message. The operations of block 1605 may be performed according to the methods described herein. In certain examples, aspects of the operations of block 1605 may be performed by a payload size configuration manager as described with reference to FIGS. 10 through 13.

At block 1610 the base station 105 may transmit a configuration message to the UE to indicate the payload size configuration. The operations of block 1610 may be performed according to the methods described herein. In certain examples, aspects of the operations of block 1610 may be performed by a configuration message manager as described with reference to FIGS. 10 through 13.

At block 1615 the base station 105 may receive the MTC PUCCH message from the UE over a plurality of RBs. The operations of block 1615 may be performed according to the methods described herein. In certain examples, aspects of the operations of block 1615 may be performed by an MTC PUCCH message manager as described with reference to FIGS. 10 through 13.

Figure 17:
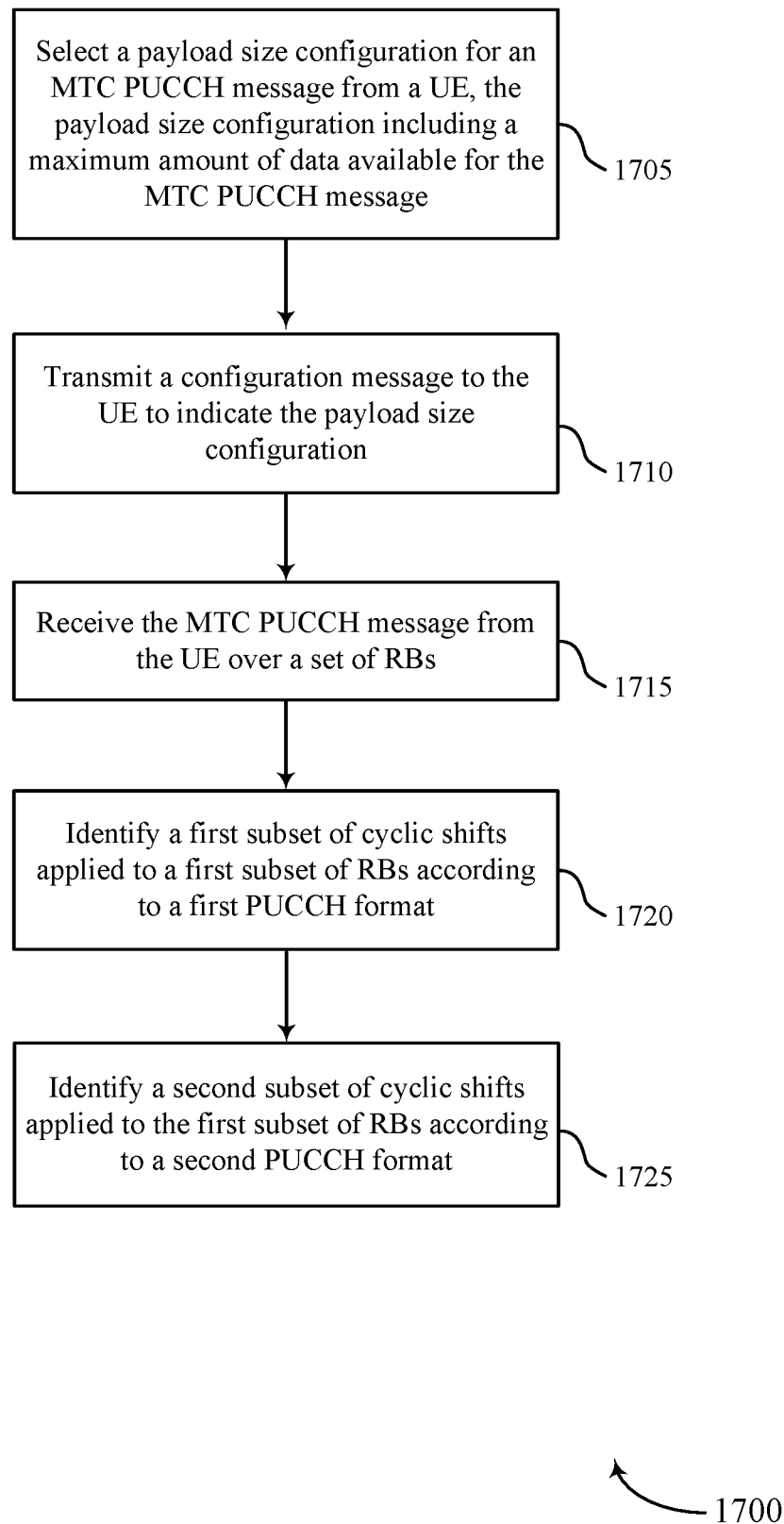

FIG. 17 shows a flowchart illustrating a method 1700 for wireless communications in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may select a payload size configuration for an MTC PUCCH message from a UE, the payload size configuration including a maximum amount of data available for the MTC PUCCH message. The operations of block 1705 may be performed according to the methods described herein. In certain examples, aspects of the operations of block 1705 may be performed by a payload size configuration manager as described with reference to FIGS. 10 through 13.

At block 1710 the base station 105 may transmit a configuration message to the UE to indicate the payload size configuration. The operations of block 1710 may be performed according to the methods described herein. In certain examples, aspects of the operations of block 1710 may be performed by a configuration message manager as described with reference to FIGS. 10 through 13.

At block 1715 the base station 105 may receive the MTC PUCCH message from the UE over a plurality of RBs. The operations of block 1715 may be performed according to the methods described herein. In certain examples, aspects of the operations of block 1715 may be performed by an MTC PUCCH message manager as described with reference to FIGS. 10 through 13.

At block 1720 the base station 105 may identify a first subset of cyclic shifts applied to a first subset of RBs according to a first PUCCH format. The operations of block 1720 may be performed according to the methods described herein. In certain examples, aspects of the operations of block 1720 may be performed by an RB manager as described with reference to FIGS. 10 through 13.

At block 1725 the base station 105 may identify a second subset of cyclic shifts applied to the first subset of RBs according to a second PUCCH format. The operations of block 1725 may be performed according to the methods described herein. In certain examples, aspects of the operations of block 1725 may be performed by an RB manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA, or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a user equipment (UE), a configuration message indicating a payload size configuration for machine type communication (MTC) physical uplink control channel (PUCCH) messages;
   generating an MTC PUCCH message based at least in part on the payload size configuration and a PUCCH format of MTC uplink control information for transmission by the UE;
   applying a sequence to different tones of a plurality of resource blocks (RBs) of the MTC PUCCH message, wherein the sequence is non-repeating in a frequency domain over the plurality of RBs; and
   transmitting the MTC PUCCH message over the plurality of RBs in the frequency domain.

2. The method of claim 1, further comprising:
   identifying, based at least in part on the payload size configuration, a data symbol to use for modulating data bits in a computer generated sequence (CGS) of an RB of the plurality of RBs; and
   modulating each CGS of the RB, wherein each CGS of the RB is modulated with a different data symbol.

3. The method of claim 1, further comprising:
   identifying, based at least in part on the payload size configuration, a data symbol to use for modulating data bits in a computer generated sequence (CGS) of an RB of the plurality of RBs; and
   modulating each CGS of the RB, wherein each CGS of the RB is modulated with a same data symbol.

4. The method of claim 1, further comprising:
repeating a reference signal in the plurality of RBs of the MTC PUCCH message.

5. The method of claim 1, further comprising:
applying, for the UE, a same cyclic shift to each of the plurality of RBs of the MTC PUCCH message; and
applying, for the UE, a same cover code to different symbol periods in each of the plurality of RBs of the MTC PUCCH message.

6. A method for wireless communication, comprising:
selecting a payload size configuration for a machine type communication (MTC) physical uplink control channel (PUCCH) message from a user equipment (UE), the payload size configuration comprising a maximum amount of data available for the MTC PUCCH message;
transmitting a configuration message to the UE to indicate the payload size configuration;
receiving the MTC PUCCH message from the UE over a plurality of resource blocks (RBs); and
recovering each of the plurality of RBs of the MTC PUCCH message using a sequence applied to different tones of the plurality of RBs of the PUCCH message, wherein the sequence is non-repeating over the plurality of RBs.

7. The method of claim 6, further comprising:
demodulating each CGS of the plurality of RBs of the MTC PUCCH message, wherein each CGS of the plurality of RBs is modulated with a different data symbol.

8. The method of claim 6, further comprising:
demodulating each CGS of the plurality of RBs of the MTC PUCCH message, wherein each CGS of the plurality of RBs is modulated with a same data symbol.

9. The method of claim 6, further comprising:
receiving a reference signal in the plurality of RBs of the MTC PUCCH message, wherein the reference signal is repeated in the plurality of RBs.

10. The method of claim 6, further comprising:
reversing cyclically shifting, for the UE, each of the plurality of RBs of the MTC PUCCH message using a same cyclic shift code; and
recovering each of the plurality of RBs of the MTC PUCCH message using a same cover code.

11. An apparatus for wireless communication, comprising:
a processor;
memory in electronic communication with the processor; and
instructions stored in the memory and operable, when executed by the processor, to cause the apparatus to:
receive, at a user equipment UE, a configuration message indicating a payload size configuration for machine type communication (MTC) physical uplink control channel (PUCCH) messages,
generate an MTC PUCCH message based at least in part on the payload size configuration and a PUCCH format of MTC uplink control information for transmission by the UE,
apply a sequence to different tones of a plurality of resource blocks (RBs) of the MTC PUCCH message, wherein the sequence is non-repeating in a frequency domain over the plurality of RBs, and
transmit the MTC PUCCH message over a plurality of RBs in Rail the frequency domain.

12. The apparatus of claim 11, wherein the instructions are further executable by the processor to:
identify, based at least in part on the payload size configuration, a data symbol to use for modulating data bits in a computer generated sequence (CGS) of an RB of the plurality of RBs, and
modulate each CGS of the RB, wherein each CGS of the RB is modulated with a different data symbol.

13. The apparatus of claim 11, wherein the instructions are further executable by the processor to:
identify, based at least in part on the payload size configuration, a data symbol to use for modulating data bits in a computer generated sequence (CGS) of an RB of the plurality of RBs, and
modulate each CGS of the RB, wherein each CGS of the RB is modulated with a same data symbol.

14. The apparatus of claim 11, wherein the instructions are further executable by the processor to:
repeat a reference signal in the plurality of RBs of the MTC PUCCH message.

15. An apparatus for wireless communication, comprising:
a processor;
memory in electronic communication with the processor; and
instructions stored in the memory and operable, when executed by the processor, to cause the apparatus to:
select a payload size configuration for a machine type communication (MTC) physical uplink control channel (PUCCH) message from a user equipment (UE), the payload size configuration comprising a maximum amount of data available for the MTC PUCCH message,
transmit a configuration message to the UE to indicate the payload size configuration,
receive the MTC PUCCH message from the UE over a plurality of resource blocks (RBs), and
recover each of the plurality of RBs of the MTC PUCCH message using a sequence applied to different tones of the plurality of RBs of the PUCCH message, wherein the sequence is non-repeating over the plurality of RBs.

16. The apparatus of claim 15, wherein the instructions are further executable by the processor to:
demodulate each CGS of the plurality of RBs of the MTC PUCCH message, wherein each CGS of the plurality of RBs is modulated with a different data symbol.

17. The apparatus of claim 15, wherein the instructions are further executable by the processor to:
demodulate each CGS of the plurality of RBs of the MTC PUCCH message, wherein each CGS of the plurality of RBs is modulated with a same data symbol.

18. The apparatus of claim 15, wherein the instructions are further executable by the processor to:
receive a reference signal in the plurality of RBs of the MTC PUCCH message, wherein the reference signal is repeated in the plurality of RBs.

* * * * *